Figure 1:
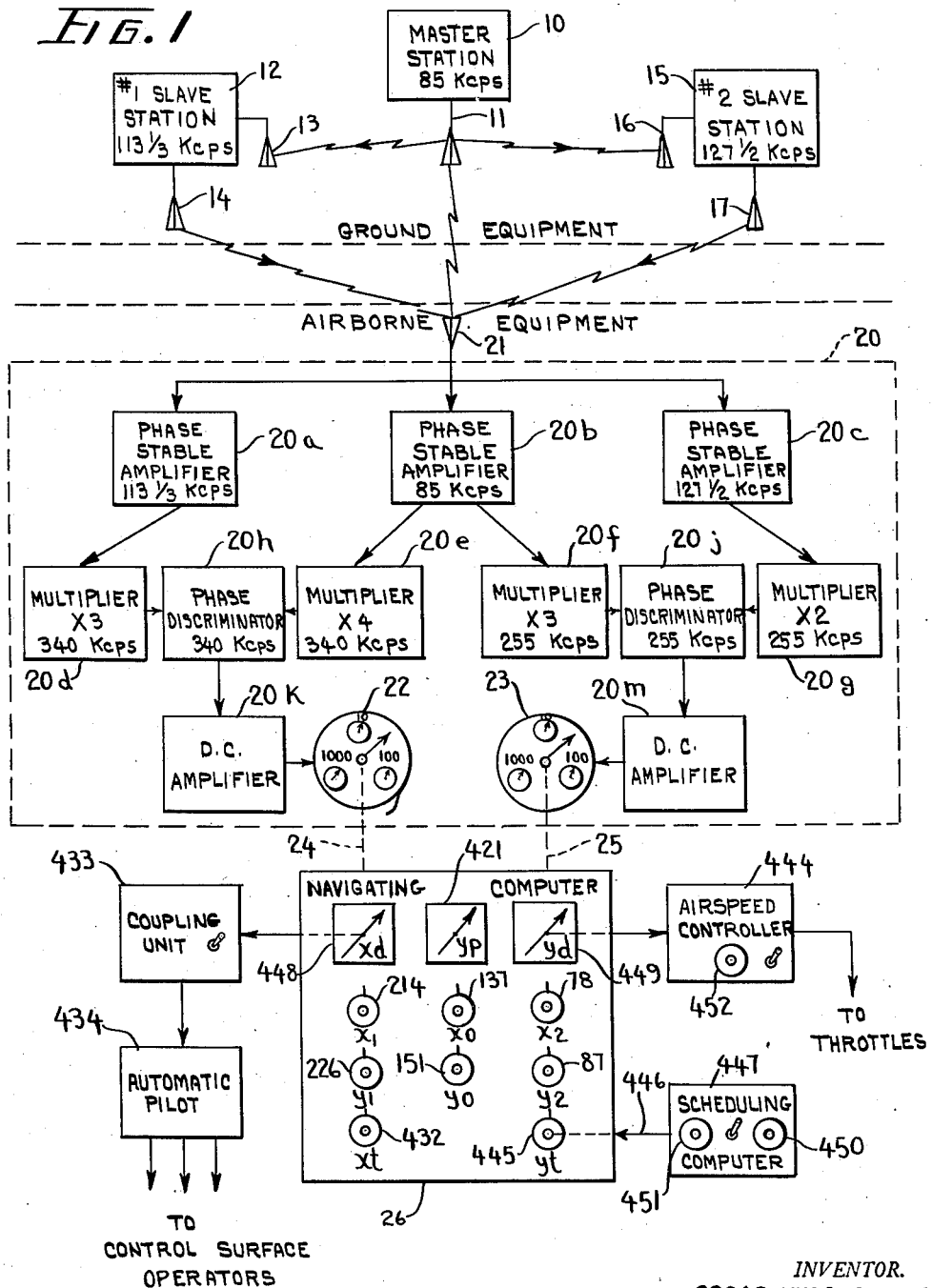

July 4, 1961     O. H. SCHUCK     2,991,011
HYPERBOLIC NAVIGATION SYSTEM AND COMPUTER THEREFOR
Filed Dec. 2, 1948     8 Sheets-Sheet 1

INVENTOR.
OSCAR HUGO SCHUCK
BY
ATTORNEY

July 4, 1961 O. H. SCHUCK 2,991,011
HYPERBOLIC NAVIGATION SYSTEM AND COMPUTER THEREFOR
Filed Dec. 2, 1948 8 Sheets-Sheet 2

INVENTOR.
OSCAR HUGO SCHUCK
BY *George H Fisher*
ATTORNEY

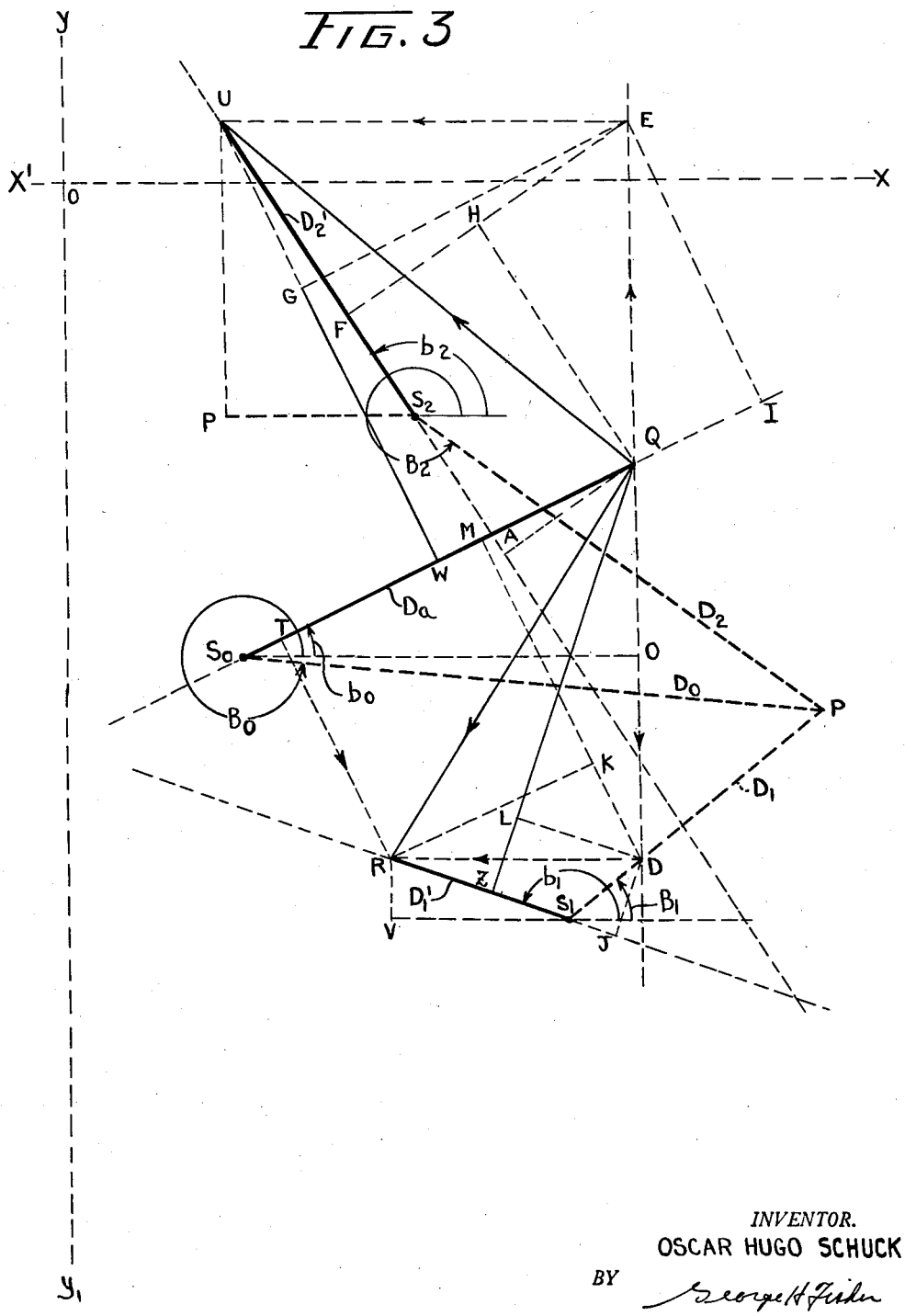

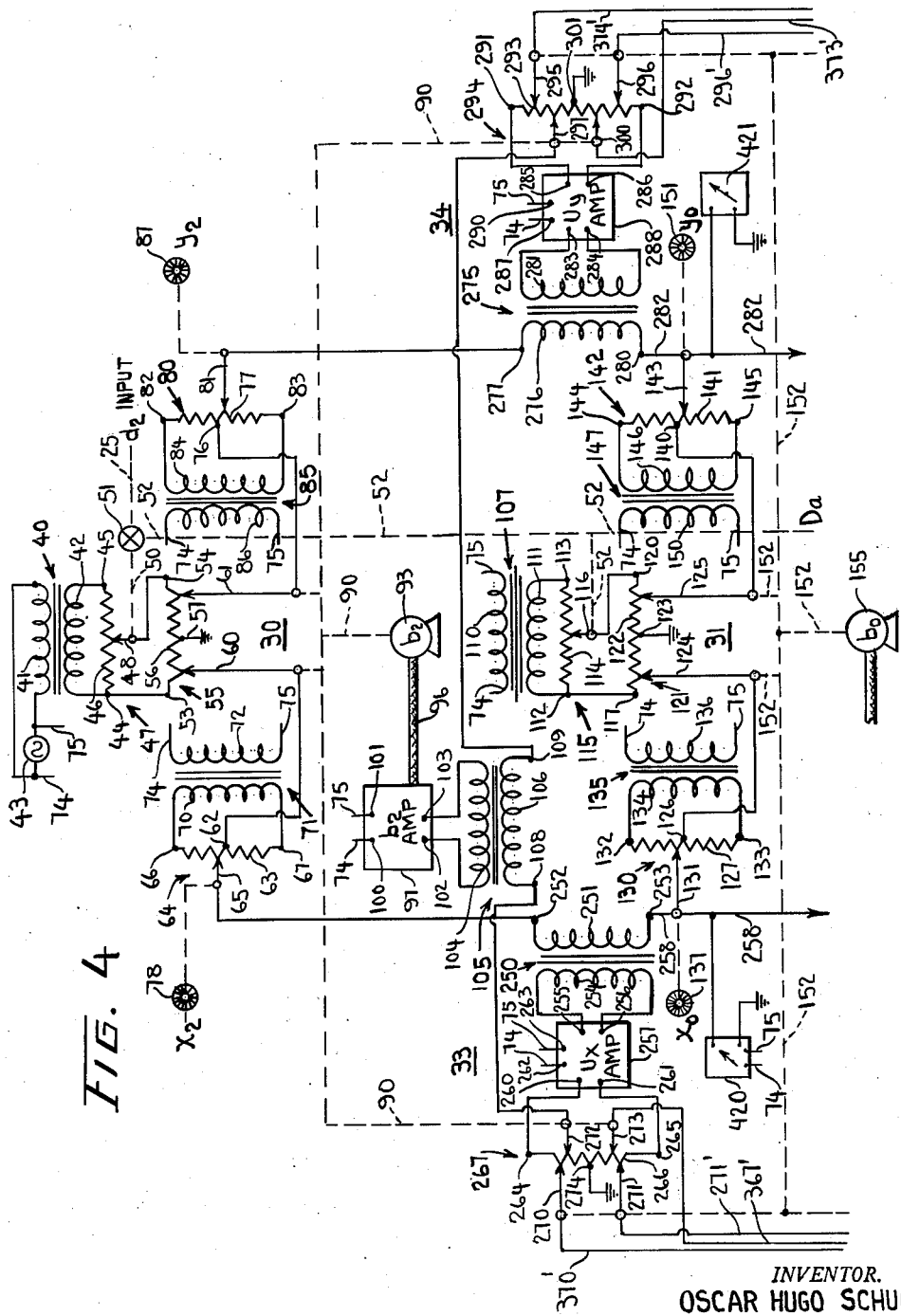

July 4, 1961

O. H. SCHUCK 2,991,011

HYPERBOLIC NAVIGATION SYSTEM AND COMPUTER THEREFOR

Filed Dec. 2, 1948

8 Sheets-Sheet 5

INVENTOR.
OSCAR HUGO SCHUCK
BY *George H Fisher*

ATTORNEY

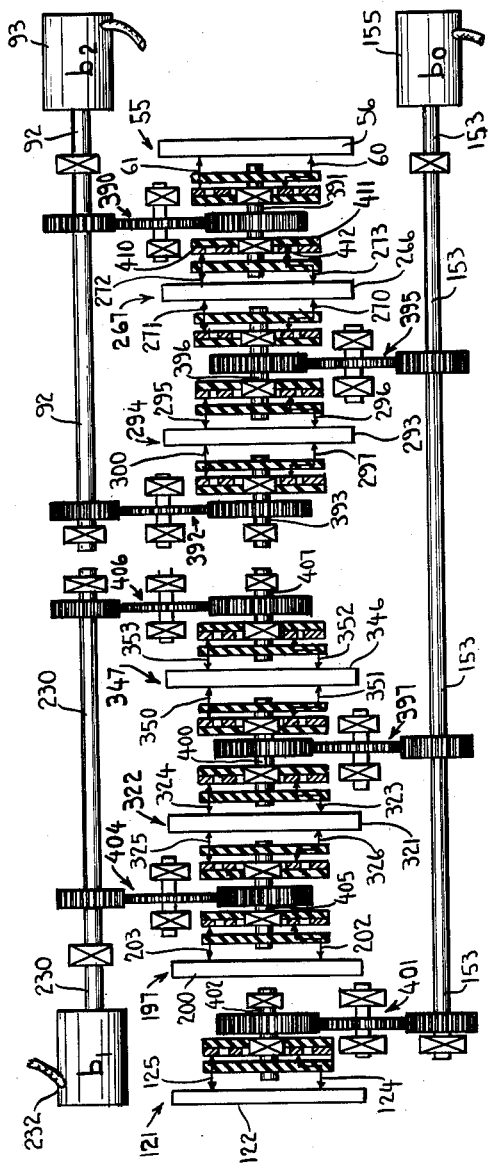

July 4, 1961 O. H. SCHUCK 2,991,011
HYPERBOLIC NAVIGATION SYSTEM AND COMPUTER THEREFOR
Filed Dec. 2, 1948 8 Sheets-Sheet 7
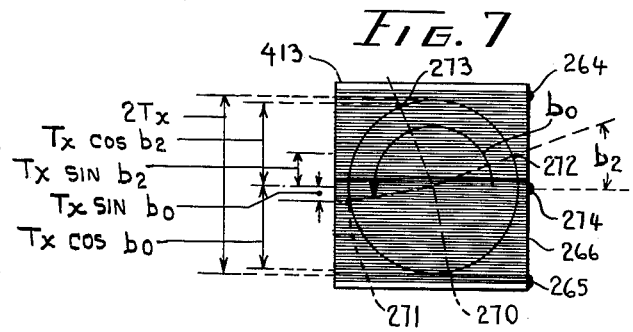
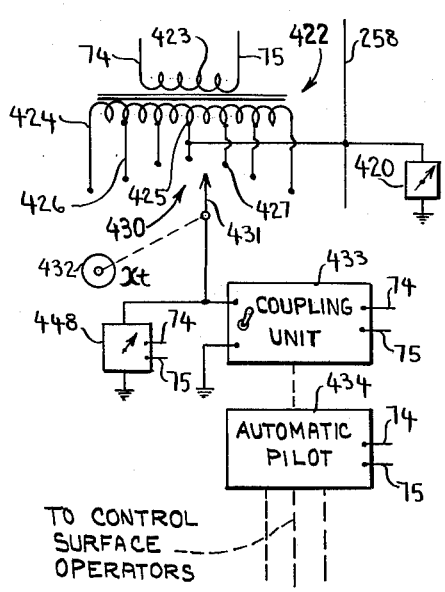
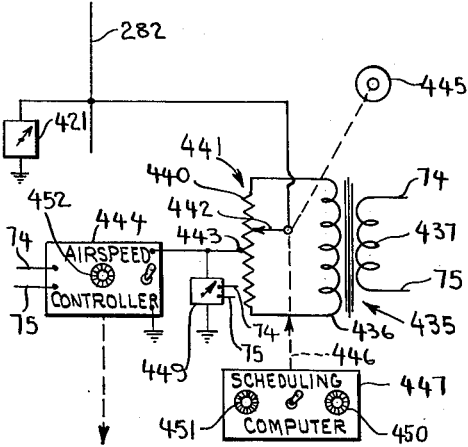
*INVENTOR.*
OSCAR HUGO SCHUCK
BY
*ATTORNEY*

July 4, 1961  O. H. SCHUCK  2,991,011
HYPERBOLIC NAVIGATION SYSTEM AND COMPUTER THEREFOR
Filed Dec. 2, 1948  8 Sheets-Sheet 8

INVENTOR.
OSCAR HUGO SCHUCK
BY George H Fisher
ATTORNEY

United States Patent Office 2,991,011
Patented July 4, 1961

2,991,011
HYPERBOLIC NAVIGATION SYSTEM AND COMPUTER THEREFOR
Oscar Hugo Schuck, Minneapolis, Minn., assignor to Minneapolis-Honeywell Regulator Company, Minneapolis, Minn., a corporation of Delaware
Filed Dec. 2, 1948, Ser. No. 63,016
9 Claims. (Cl. 235—187)

This invention relates to the field of navigation, and more particularly to radio instruments for use in coordinating the movement of a craft, especially an aircraft, with a selected path.

Devices are known for stabilizing the attitude of an aircraft, about its pitch and roll axes, with respect to the vertical, and about its yaw axis, with respect to a geographic heading. Such devices are called automatic pilots, and may also include means for controlling the air speed and altitude of the craft with respect to the surface of the earth.

The problem of causing a craft to follow a selected path introduces the additional complication of variable wind, which results in movement of the craft in a direction other than that in which it is heading. Wind also has an effect on the ground speed made good for a particular air speed, and thus causes the movement of the craft to depart from that called for by its schedule. Neither of these effects can be corrected by the automatic pilot, and independent radio actuated means are provided for this purpose.

Radio systems are known by which the bearing of a moving craft from a transmitter, measured with respect to a standard direction such as geographic north, can be determined. The Omnidirectional Range, and the Automatic Direction Finder in combination with a magnetic compass, are examples of such systems. Similarly, radio means are known by which the distance of a moving craft from a transmitter can be determined: the Distance Measuring Equipment is an example of such a system.

A number of radically different radio systems are also available for determining the position of a craft. These systems can be referred to in general terms as hyperbolic navigation systems, of which "Loran" is probably the best known: other systems of the same type have been identified as the "Gee," "Popi" and "Decca" systems.

In each of these systems the information made available in the craft is neither a distance nor a bearing, but simply a pair of distance differences. Two pairs of transmitters are fixed in known locations, and the differences between the distances from the craft to the two stations of each pair are determined in the craft by suitable circuit means. Each distance difference determines one or more hyperbolic loci, with respect to the pair of stations concerned, on which the craft is located, and the position of the craft is determined by the point or points of intersection of the hyperbolic loci. By consulting maps prepared with hyperbolic line overprints, the pilot may provide himself with exact information as to his location, to a degree of accuracy rivaling normal astronomical determination.

The present invention serves to determine, from the two distance differences supplied by the radio instrument, the location of the craft in a coordinate system whose Y-axis is aligned with the path to be followed. Thus the abscissa of the position of the craft is a measure of its deviation from the assigned track and may be used to correct the heading of the craft. The ordinate of the position of the craft is a measure of its distance from a virtual or real destination represented by the origin of the axes, and may be compared with a scheduled ordinate to give a signal for controlling the air speed of the craft. Consultation of a map by a human intermediary is obviated, and automatic control of the craft's heading and air speed to maintain scheduled movement along the assigned path is possible.

Accordingly an object of the invention is to provide means for indicating the relation between the actual movement of a craft and its scheduled movement along an assigned path, by means of the signals supplied by a navigation system of the hyperbolic type.

Another object of the invention is to provide means for controlling the movement of a craft so that it follows an assigned path by means of radio signals of the type described.

Another object of the invention is to provide means giving continuous indication of the projection, upon an assigned track, of the distance from a craft to its destination, by means of such radio signals.

Another object of the invention is to provide means giving continuous indication of the distance of a craft from an assigned track, by means of said radio signals.

Another object of the invention is to provide means determining the components, perpendicular and parallel to an assigned track, of the displacement of said craft from a scheduled position, by means of said radio signals.

Another object of the invention is to provide a graphical computer for indicating, and giving electrical outputs proportional to, the distance of a craft from its assigned track, or its along-track distance to destination, or its off-schedule distance, or any combination thereof, by means of such radio signals.

A further object of the invention is to provide means for determining the coordinates of a movable point when the coordinates of three fixed points, and the differences between distances from the movable point to pairs of the fixed points, are known.

A further object of the invention is to provide means as just recited, in which the directions of a movable point from the three fixed points, and one distance, are given arbitrary values, the latter determining arbitrary values for the other two distances, so as to define three points at the ends of vectors of arbitrary length and direction, together with means computing the components, normal and parallel to the assumed directions, of discrepancy vectors joining the points, and with means changing the arbitrary directions in accordance with the components normal thereto and changing the arbitrary distance in accordance with the components parallel thereto.

Other objects, advantages, and features of novelty which characterize my invention will become apparent from a reading of the specification, or are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 2:
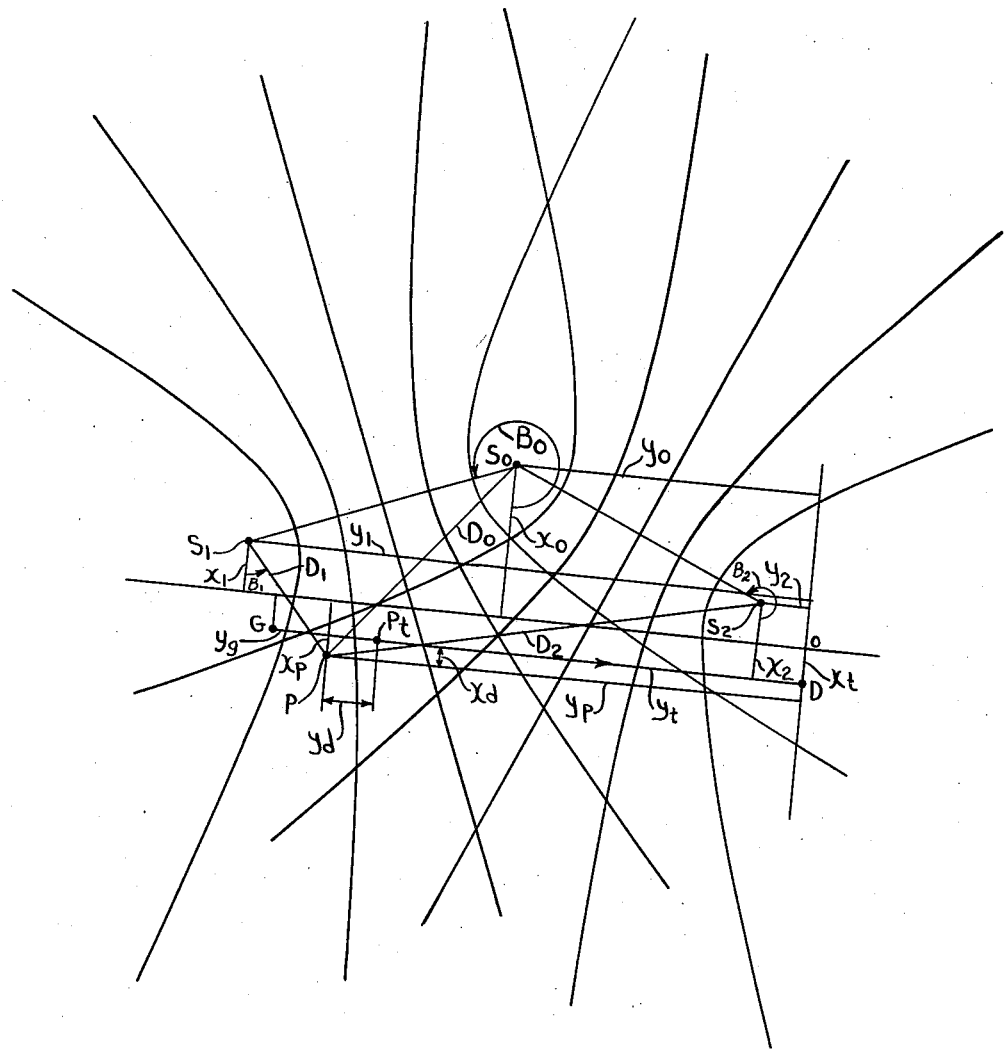
Figure 10:
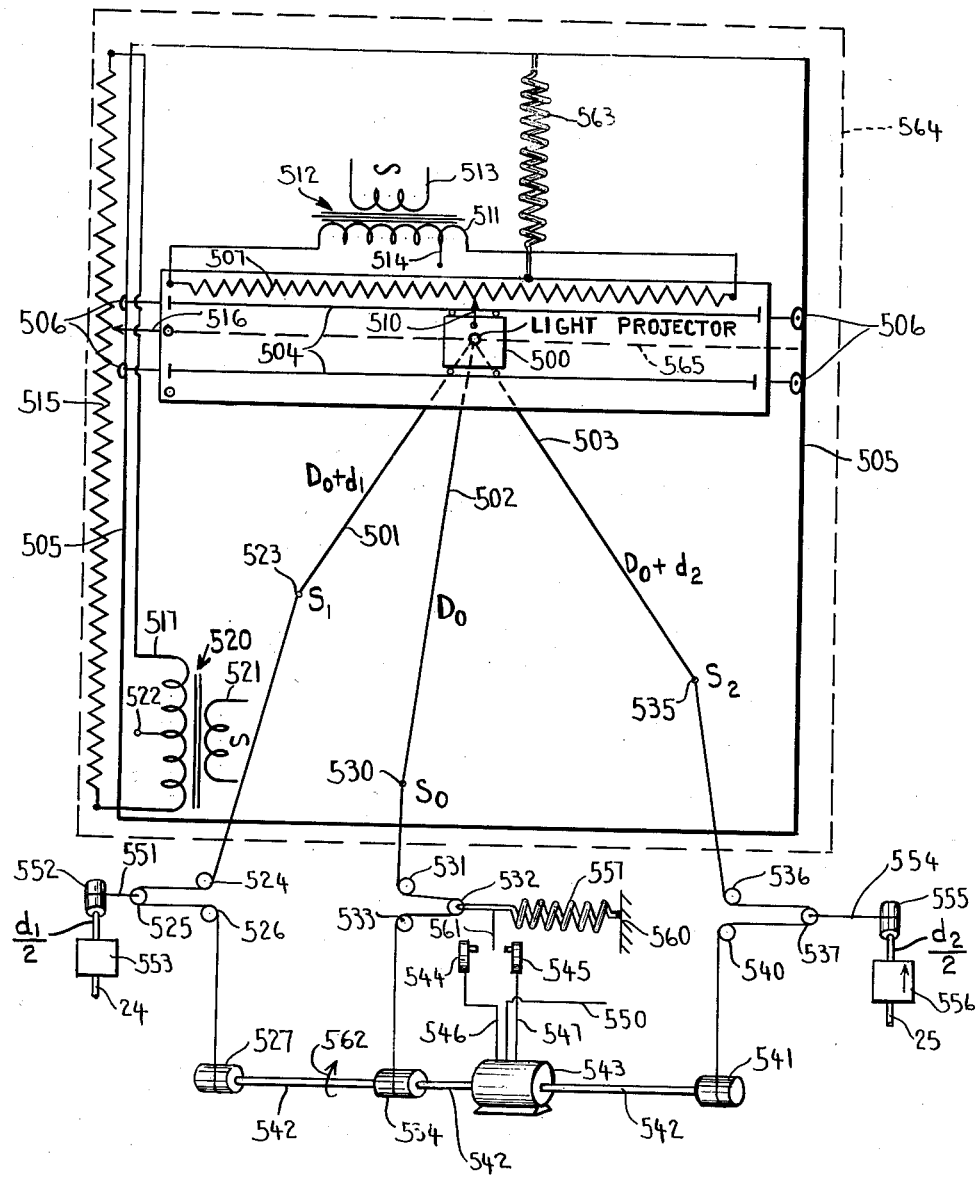

In the drawing:
FIGURE 1 is a general view of the components of a system according to the invention;
FIGURES 2 and 3 are illustrative of the problem presented and the analytical method of solving it;
FIGURES 4 and 5 together comprise a wiring diagram of an analytical computer for performing the functions indicated in FIGURE 3;
FIGURES 6 and 7 show mechanical details of a component of the invention;
FIGURES 8 and 9 show further details of the structure of FIGURE 1; and
FIGURE 10 shows a graphical computer for use interchangeable with that shown in FIGURES 1 and 4–8.

Because of its relative simplicity the Decca system is used in this application as an example of the hyperbolic time difference systems from the signals of which a craft is to be controlled. Full details of the Decca system are given in the report of the Electronic Subdivision, Advisory Group on Air Navigation, dated June 1946 and identified by symbol TSELC–SP2: the discussion of the Decca system is found on pages 519 to 527. To those skilled in the art it will be at once apparent that the principle of my invention can be applied equally well to Loran, Gee, Popi, or any other hyperbolic navigation system, and invention of this breadth is specifically asserted.

A brief description of an embodiment of the Decca system follows, for convenience in consideration of the invention as a whole. As shown in FIGURE 1, a "master" station 10 having a transmitting antenna system 11, is located in convenient relation to a first "slave" station 12 having a receiving antenna system 13 and a transmitting antenna system 14, and to a second "slave" system 15 having a receiving antenna system 16 and a transmitting antenna system 17. These stations constitute the ground equipment of the Decca system, and its air-borne equipment comprises a receiver 20 having a receiving antenna system 21. Receiver 20 is shown to comprise three phase stable amplifiers 20a, 20b, and 20c, four frequency multipliers 20d, 20e, 20f, and 20g, two phase discriminators 20h and 20j, and two D.C. amplifiers 20k and 20m, energizing respectively a pair of indicating phase shift integrators 22 and 23, known as "decometers." The rotations of the decometers are repeated by suitable mechanical or electrical telemetric means 24 and 25 to comprise mechanical inputs to a navigating computer 26. Stations 10, 12, and 15 may be hundreds of miles apart, and the effective range of the system is well over 1000 miles.

FIGURE 1 should be considered in connection with FIGURE 2, which is in the nature of a map or chart. For the sake of clarity of illustration, all the geographic detail which would normally be found on a chart of this sort has been suppressed, except the locations of stations 10, 12, and 15 which are identified by the symbols $S_0$, $S_1$, and $S_2$ and the locations of a point of origin G and a point of destination D, between which it is desired to fly. As illustrative values, the distances from station $S_0$ to stations $S_1$ and $S_2$ may be 414 miles and 397 miles, respectively.

Master station 10 radiates a signal of a closely regulated frequency of 85 kilocycles per second, which is received at slave stations 12 and 15 after time intervals which depend on the distances between the stations and which determine fixed phase differences between the signal radiated and those received. In slave station 12 the frequency of the received signal is multiplied by 4/3 and reradiated at this frequency of 113⅓ kilocycles per second. Similarly the frequency of the signal received at slave station 15 is multiplied by 3/2 and reradiated at this frequency of 127½ kilocycles per second.

At receiver 20 the three signals received concurrently from the master and slave stations are selectively amplified in phase stable amplifiers 20b, 20a, and 20c. The frequency of the 113⅓ kilocycle-per-second signal from slave station 12 is tripled in multiplier 20d, and that of the 85 kilocycle-per-second signal from master station 10 is quadrupled in multiplier 20e. The two resulting 340 kilocycle-per-second signals are fed to phase discriminator 20h, whose output energizes decometer 22 through D.C. amplifier 20k. Accordingly so far as decometer 22 is concerned, the situation is just the same as though stations 10 and 12 were both radiating at the frequency of 340 kilocycles per second, and this simplification will be used in subsequent discussion.

The frequency of the 127½ kilocycle-per-second signal from slave station 15 is doubled in multiplier 20g and that of the 85 kilocycle-per-second signal from master station 10 is tripled in multiplier 20f. The two resulting 255 kilocycle-per-second signals are fed to phase discriminator 20j, whose output energizes decometer 23 through D.C. amplifier 20m. Details of these arrangements are given in the report previously mentioned.

One wave length at 340 kilocycles per second is about 2890 feet. Assuming that stations $S_0$ and $S_1$ radiate at this frequency and exactly in phase, then at a point midway between the stations there is no phase difference between the signals received from the two stations, and decometer 22 indicates zero. If the receiver is moved along the line $S_0S_1$, toward $S_0$, for a distance of 1445 feet, the distance to $S_0$ has been decreased by half a wave length, and that to $S_1$ has been increased by half a wave length. The two signals are again exactly in phase, and the decometer again reads zero.

It is not necessary that the receiver be located in the line $S_0S_1$ to give a zero signal: this will be given for any location of the receiver on a locus which is the perpendicular bisector of the line, or on any of a number of loci cutting the line at half wave intervals and diverging as they recede from the line. The loci have been found to comprise a family of hyperbolas about $S_0$ and $S_1$ as foci. In the practical case, when the phase shift resulting from the interval between the radiation of the signal from station $S_0$ and its reradiation from station $S_1$ must be considered, there is a slight shift of the whole family of hyperbolas along the line $S_0S_1$, so that the straight line locus, while still perpendicular to the line $S_0S_1$, is not its perpendicular bisector.

From the above it follows that any particular reading on decometer 22 indicates that the receiver is located on one of a number of hyperbolic loci, but neither identifies the particular hyperbola nor gives any indication of displacement from the line $S_0S_1$. The reading of decometer 23 indicates that the craft is also located on one of a number of hyperbolic loci on stations $S_0$ and $S_2$ as foci, and hence the receiver must be located at a point of intersection of two of the hyperbolas.

Since the locations of the stations are fixed and their frequencies and phase relations are very carefully stabilized, the locations of the hyperbolic loci can be plotted on a chart as illustrated in FIGURE 2, which shows only a few of the loci available. Between stations $S_0$ and $S_1$ there pass 1512 hyperbolic loci, spaced by 1445 feet, at which identical decometer readings are given, and these intervals can be subdivided into as small parts as the decometer can be read. The whole scale of decometer 22 represents 1445 feet, and that of decometer 23 represents 1930 feet. If it is possible to read the decometers to the nearest 5° of pointer motion, the receiver can theoretically be located within one of a number of roughly diamond-shaped areas 21 feet on two opposite sides and 27 feet on the other two opposite sides, each area centered on the point of intersection of two hyperbolic loci. In practice the theoretical accuracy is of course not fully achieved.

Determination of which one of the field of points of intersection is that actually occupied by the receiver must be accomplished by means independent of the Decca system. This is most easily done by starting from a point whose position on the hyperbolic grid is known. Each decometer has smaller pointers driven through gear reductions from the phase angle-responsive needle to count the number of tens, hundreds, and thousands of revolutions of the main pointer. Having once set each decometer according to the known number of wave lengths of the selected point from the two stations, the system thereafter remains unambiguous as long as it is in continuous operation whenever the position of the receiver changes.

Turning now to a consideration of the line which it is desired to fly, it must first be remembered that the only information available in the craft is the rotated position of the two decometers. Decometer 22 indicates that the difference $d_1$ between the distance $GS_0$ and the distance $GS_1$ is a certain number of full wave lengths and a residual portion of a wave length, which may be represented in feet. Decometer 23 gives similar information regarding the difference $d_2$ between the distance $GS_0$ and the distance $GS_2$. It is desirable for manual control of a craft carrying the receiver, and is indeed necessary for automatic control of a craft so that it follows a desired course, to convert these decometer readings into control outputs which measure the departure of the craft from the desired path—its cross track deviation—and the departure of the craft from the position which it should have on the track—its along track deviation. These outputs may be obtained either analytically or graphically: a graphical computer for use in their determination will now be discussed.

The graphical computer

The graphical computer pictorially presents the position of the craft as a point of light projected on a map of the area being traversed. The point of light is shown in FIGURE 10 to be projected from a point on a carriage 500 to which are connected three nonextensible funicular members or cords 501, 502, and 503. Carriage 500 moves in a substantially friction-free linear track 504 which is itself movable on rollers 506 along a base member 505, in a direction perpendicular to track 504.

A linear resistance member 507 is mounted on and insulated from track 504, and a wiper 510 is similarly carried by and insulated from carriage 500. As carriage 500 moves along track 504, slider 510 moves along member 507 in continuous electrical engagement therewith. Member 507 is energized from the secondary winding 511 of a transformer 512 whose primary winding 513 is connected to a suitable source of alternating voltage. Winding 511 is tapped at 514. A voltage appears between slider 510 and tap 514, the magnitude and phase of which depends on the amount and direction of the displacement of the carriage from a position corresponding to the position of the tap 514 on winding 511.

A second linear resistance member 515 is mounted on and insulated from base member 505, and a second wiper 516 is similarly carried by and insulated from track 504. As track 504 moves along base member 505, slider 516 moves along member 515 in continuous electrical engagement therewith. Member 515 is energized from the secondary winding 517 of a second transformer 520 whose primary winding 521 is connected to the source of alternating voltage: secondary windings 511 and 517 may if desired have a common primary winding. Winding 517 is tapped at 522, and whenever slider 516 is displaced from the center of member 515 a voltage appears between slider 516 and center tap 522, the magnitude and phase of which depends on the amount and direction of the displacement.

Cord 501 passes over a plurality of pulleys 523, 524, 525, and 526, and is fastened to a drum 527. Cord 502 passes over a plurality of pulleys 530, 531, 532, and 533 and is fastened to a drum 534. Cord 503 passes over a plurality of pulleys 535, 536, 537, and 540, and is fastened to a drum 541. Drums 527, 534, and 541 are unitarily rotatable by the shaft 542 of a motor 543, whose operation is controlled by a pair of single-pole single-throw normally closed limit switches 544 and 545 which are connected to motor 543 by suitable cables 546 and 547 to control its energization from the alternating current source through a power cable 550.

Pulleys 524, 526, 531, 533, 536, and 540 are fixed in position. The position of pulley 525 is adjusted by a cord 551 passing over a drum 552 which is rotated through an angle proportional to $D_1/2$ by a connection to decometer 22 including a two-to-one gear reduction 553 and telemetric system 24. The position of pulley 537 is adjusted by a cord 554 passing over a drum 555 which is rotated through an angle proportional to $D_2/2$ by a connection to decometer 23 including a two-to-one gear reduction 556 and telemetric system 25.

The position of pulley 532 is determined by the tension in cord 502, which is opposed by a spring 557 interposed between pulley 532 and a fixed portion 560 of the computer. Movable with pulley 532 is a member 561 which extends between switches 544 and 545. For a particular value of tension in cord 502 neither switch is operated. If the tension increases, switch 544 is operated energizing motor 543 to rotate in a "forward" direction, as indicated by arrow 562, to increase the unwound length of all the cords. If the tension in cord 502 decreases from the particular value, switch 545 is operated, energizing motor 543 to operate in the "reverse" direction and decrease the unwound length of all the cords.

Motion of carriage 500 along track 504 is not opposed in either direction. Motion of track 504 downward as seen in FIGURE 10 is opposed by a spring 563, which may be conveniently of the type used in window shades, since it is desirable that the spring rate remain essentially constant for various elongated conditions of the spring. The force exerted by spring 563 is opposed by the force exerted in spring 557 and by the tension in cables 501 and 503.

As previously mentioned, base member 505, track 504, and carriage 500 are mounted beneath a map which is shown at 564. Pulleys 530, 523, and 535 are movably mounted for positioning directly under the locations on the map of stations $S_0$, $S_1$, and $S_2$, and base member 505 may be rotated in its own plane independently of the position of pulleys 523, 530, and 535, so that the line of movement of carriage 500, indicatted at 565, is parallel to the track to be flown.

The instrument is set up by bringing the receiver to a position whose distances from $S_0$, $S_1$, and $S_2$ are known. The radio receiver controlling the operation of members 24 and 25 is set in operation to determine the positions of drums 552 and 555. Drums 534, 527, and 541 are loosened on shaft 542 and adjusted until carriage 500 and track 504 come to rest in such a position that the projected point of light from the carriage 500 strikes the under side of the map at the known location, and at the same time neither switch 544 nor switch 545 is being operated. When this condition has been achieved, the drums are finally tightened on shaft 542, and the system is in operation.

It can be shown that for any instantaneous values of $d_1$ and $d_2$ there is a unique rotated position of shaft 542 for which the tension on cord 502 has the same value as at the initial setting, and that this unique position of shaft 542 results in location of the light projector directly under the position on the map occupied by the craft for the decometer readings $d_1$ and $d_2$. Accordingly, it is necessary only that the pilot fly so that the point of light remains on a course plotted on the map to ensure that the craft follows that course in fact. Control voltages proportional to the displacement of the craft from the line and along the line are also obtainable between sliders 516 and 510 and taps 522 and 514, respectively, and can be made use of to automatically control the flight of the craft if this is desired.

While the graphical computer has advantages of simplicity and pictorial presentation, it is bulky, particularly for extended flights when high accuracy is required, since a large scale map is required. Flights which cross the lines joining the ground stations are not easily made, and the area not included between lines through $S_1$ and $S_2$ perpendicular to 565 cannot be entered. These limitations are not found in the analytical computer, which will now be described.

The analytical computer

A Cartesian coordinate system may be superimposed on the chart of FIGURE 2, with its axis of ordinates parallel to GD and its axis of abcissas passing through D. The coordinates of D are hence $x_t$, 0, and those of G are $x_t$, $y_g$. The value of $x_t$ is thus arbitrarily selected, and that of $y_g$ can be determined from the chart, as can the coordinates $x_0$, $y_0$ of station $S_0$, $x_1$, $y_1$ of station $S_1$ and $x_2$, $y_2$ of station $S_2$.

For purposes of illustration, assume that a craft is located at point P ($x_p$, $y_p$) and that for flight along its desired path at its assigned speed its scheduled position is $P_t$ ($x_t$, $y_t$). The craft is equipped with receiver 20, and its distances from $S_0$, $S_1$, and $S_2$ are respectively $D_0$, $D_1$ and $D_2$ miles. Decometer 22 indicates the difference $D_0-D_1$ between the distances from the craft to stations $S_0$ and $S_1$, and decometer 23 indicates the difference $D_0-D_2$ between the distances from the craft to stations $S_0$ and $S_2$: by definition $$d_1 = D_0 - D_1 \quad (1)$$

and $$d_2 = D_0 - D_2 \quad (2)$$

The bearings of point P from stations $S_0$, $S_1$, and $S_2$, measured counterclockwise from the positive direction of the axis of abcissas, are respectively $B_0$, $B_1$, and $B_2$: the actual values of $D_0$, $D_1$, $D_2$, $B_0$, $B_1$, and $B_2$ are not known in the craft.

It is desired to determine the off-track distance $x_d$ and the off-schedule distance $y_d$, as well as the distance to destination $y_p$, of the craft located at point P, expressed in terms of $x_0$, $x_1$, $x_2$, $y_0$, $y_1$, $y_2$, $d_1$, and $d_2$. This is done by simultaneous solution of equations as indicated below, reference now being made to FIGURE 3.

First assume arbitrary values $b_0$, $b_1$, and $b_2$, for $B_0$, $B_1$, and $B_2$. Further assume an arbitrary value $D_a$ for $D_0$, so that arbitrary values $D_1'$ and $D_2'$ can be computed for $D_1$ and $D_2$ from Equations 1 and 2. These bearings and distances determine the positions of points Q, R, and U, which in general do not coincide. Upon adjusting $b_0$, $b_1$, $b_2$, and $D_a$ to make points Q, R, and U coincide, the location of the point of coincidence is the location of point P, and has the same coordinates. "Discrepancy vectors" $\overline{QU}$ and $\overline{QR}$ are drawn from point Q to points R and U. The component $\overline{QZ}$ of vector $\overline{QR}$ perpendicular to $\overline{S_1R}$, the component $\overline{QA}$ of vector $\overline{QU}$ perpendicular to $\overline{S_2U}$, and the components $\overline{TR}$ and $\overline{WU}$ of vectors $\overline{QR}$ and $\overline{QU}$ perpendicular to $\overline{S_0Q}$ are taken as measures of the corrections needed in $b_1$, $b_2$, and $b_0$, respectively, and the sum of components $\overline{QT}$ and $\overline{QW}$ of vectors $\overline{QR}$ and $\overline{QU}$ parallel to $\overline{S_0Q}$ is taken as a measure of the correction necessary in $D_a$. The stability of the system is increased if the control of $D_a$ is also influenced by the components $\overline{ZR}$ and $\overline{AU}$ of vectors $\overline{QR}$ and $\overline{QU}$ parallel to $\overline{S_1R}$ and $\overline{S_2U}$: this is due to the dependence of $D_1'$ and $D_2'$ on $D_a$.

By mathematical analysis it can be shown that $$x_q = x_0 + D_a \cos b_0 \quad (3)$$
$$x_r = x_1 + D_1' \cos b_1 \quad (4)$$
$$x_u = x_2 + D_2' \cos b_2 \quad (5)$$
$$y_q = y_0 + D_a \sin b_0 \quad (6)$$
$$y_r = y_1 + D_1' \sin b_1 \quad (7)$$
$$y_u = y_2 + D_2' \sin b_2 \quad (8)$$

subject to the restrictions of Equations 1 and 2.

The X— and Y— components $R_x (=\overline{DR})$, $R_y (=\overline{QD})$, and $U_x (=\overline{UE})$, $U_y (=\overline{QE})$, of the discrepancy vectors $\overline{QR}$ and $\overline{QU}$ can be shown to be $$R_x = x_r - x_q = x_1 + D_1' \cos b_1 - x_0 - D_a \cos b_0 \quad (9)$$
$$R_y = y_r - y_q = y_1 + D_1' \sin b_1 - y_0 - D_a \sin b_0 \quad (10)$$
$$U_x = x_u - x_q = x_2 + D_2' \cos b_2 - x_0 - D_a \cos b_0 \quad (11)$$
$$U_y = y_u - y_q = y_2 + D_2' \sin b_2 - y_0 - D_a \sin b_0 \quad (12)$$

The controlling components $V_0$, $V_1$, and $V_2$ which are to determine the corrections in $b_0$, $b_1$, and $b_2$ respectively have the values $$V_0 = R_y \cos b_0 - R_x \sin b_0 + U_y \cos b_0 - U_x \sin b_0 \quad (13)$$
$$V_1 = R_y \cos b_1 - R_x \sin b_1 \quad (14)$$
$$V_2 = U_y \cos b_2 - U_x \sin b_2 \quad (15)$$

The controlling component $V_d$ which is to determine the correction in $D_a$ has the value $$V_d = R_y \sin b_0 + R_x \cos b_0 + U_y \sin b_0 + U_x \cos b_0$$
$$+ R_y \sin b_1 + R_x \cos b_1 + U_y \sin b_2 + U_x \cos b_2 \quad (16)$$

When $b_0$, $b_1$, $b_2$, and $D_a$ have been adjusted so that $V_0$, $V_1$, $V_2$, and $V_d$ are all zero, the points U, Q, and R all coincide with point P, and $$x_q = x_r = x_u = x_p \quad (17)$$
$$y_q = y_r = y_t = y_p \quad (18)$$

Thus the X— and Y— coordinates of the point P can be determined.

FIGURES 4 and 5 together give a wiring diagram of a computer according to the invention. For convenience of description, the circuit as a whole is subdivided more or less arbitrarily into subordinate components: it must be remembered that the components are actually interdependent.

The subdivisions referred to above comprise a $b_2$ component 30, a $b_0$ component 31, a $b_1$ component 32, a $U_x$ component 33, a $U_y$ component 34, an $R_x$ component 35, an $R_y$ component 36, and a $D_0$ component 37.

The $b_2$ component 30 of computer 26 includes a transformer 40 having a primary winding 41 and a secondary winding 42. Means 43 are provided for connecting winding 41 with a supply of alternating voltage, which also energizes other windings and amplifiers as will be set forth: means 43 is hereafter referred to as a "source" of alternating voltage. Secondary winding 42 is connected to the terminals 44 and 45 of the linear resistance winding 46 of a voltage divider 47 having a slider 48 driven by the output shaft 50 of a differential 51. One input to differential 51 comprises member 25 of FIGURE 1 and is moved in accordance with the value of $d_2$. A second input is supplied to differential 51 by a shaft 52.

Terminal 44 and slider 48 of voltage divider 47 are connected respectively to terminals 53 and 54 of a resolver 55 having a resistance winding 56, center tapped at 57, and a pair of sliders 60 and 61. Center tap 57 is grounded. The structure of resolver 55 and other resolvers will be described in further detail in connection with FIGURE 5: briefly its nature is such that changes in the positions of sliders 60 and 61 result in trigonometric changes in the voltages between the sliders and center tap 57.

Slider 60 is connected to a center tap 62 on the linear resistance winding 63 of a voltage divider 64 having a slider 65. The terminals 66 and 67 of winding 63 are energized from the secondary winding 70 of a transformer 71 whose primary winding 72 is energized from source 43 through conductors 74 and 75. Slider 65 is actuated by a manual knob 78.

Slider 61 of resolver 55 is connected to a center tap 76 on the linear resistance winding 77 of a voltage divider 80 having a slider 81. The terminals 82 and 83 of winding 77 are energized from the secondary winding 84 of a transformer 85 whose primary winding 86 is energized from source 43 through conductors 74 and 75. Slider 81 is actuated by a manual knob 87.

Sliders 60 and 61 of resolver 55 are unitarily actuated by a shaft 90 driven by a motor 93. Motor 93 is connected by a suitable cable 96 to a motor control amplifier 97 having power terminals 100 and 101, energized from source 43 through conductors 74 and 75, and input terminals 102 and 103 energized from the secondary winding 104 of a transformer 105 having a primary winding 106 with terminals 108 and 109.

The $b_0$ component 31 of computer 26 includes a transformer 107 having a primary winding 110 and a secondary winding 111. Primary winding 110 is energized from source 43 through conductors 74 and 75. Secondary winding 111 is connected to terminals 112 and 113 of the linear resistance winding 114 of a voltage divider 115 having a slider 116 driven by shaft 52.

Terminal 112 and slider 116 of voltage divider 115 are connected respectively to terminals 117 and 120 of a resolver 121 like resolver 55, having a resistance winding 122, center tapped at 123, and a pair of sliders 124 and 125. Center tap 123 is grounded.

Slider 124 is connected to a center tap 126 on the linear winding 127 of a voltage divider 130 having a slider 131. The terminals 132 and 133 of winding 127 are energized from the secondary winding 134 of a transformer 135 whose primary winding 136 is energized from source 43 through conductors 74 and 75. Slider 131 is actuated by a manual knob 137.

Slider 125 of resolver 121 is connected to a center tap 140 on the linear winding 141 of a voltage divider 142 having a slider 143. The terminals 144 and 145 of winding 141 are energized from the secondary winding 146 of a transformer 147 whose primary winding 150 is energized from source 43 through conductors 74 and 75. Slider 143 is actuated by a manual knob 151.

Sliders 124 and 125 of resolver 121 are unitarily actuated by a shaft 152 driven by a motor 155. This motor is connected by a suitable cable 156 to a motor control amplifier 157 having power terminals 160 and 161, energized from source 43 through conductors 74 and 75, and input terminals 162 and 163 energized from a series circuit including the secondary windings 164 and 165 of a pair of transformers 166 and 167 having primary windings 170 and 171, each of which has a grounded terminal, shown at 172 and 173, and an ungrounded terminal, shown at 174 and 175. A pair of parallel summing resistors 176 and 177 are connected to terminal 174 of transformer 166, and a second pair of parallel summing resistors 180 and 181 are connected to terminal 175 of transformer 167.

The $b_1$ component 32 of computer 26 includes a transformer 182 having a primary winding 183 energized from source 43 through conductors 74 and 75 and a secondary winding 184. Secondary winding 184 is connected to the terminals 185 and 186 of the linear resistance winding 187 of a voltage divider 190 having a slider 191 driven by the output shaft 192 of a differential 193, one input to which comprises member 24 of FIGURE 1 and is moved in accordance with the value of $d_1$. A second input is supplied to differential 193 by shaft 52.

Terminal 185 and slider 191 of voltage divider 190 are connected respectively to terminals 195 and 196 of a resolver 197 like resolver 55, having a resistance winding 200, center tapped at 201, and a pair of sliders 202 and 203. Center tap 201 is grounded.

Slider 202 is connected to a center tap 204 on the linear resistance winding 205 of a voltage divider 206 having a slider 207. The terminals 208 and 210 of winding 205 are energized from the secondary winding 211 of a transformer 212 whose primary winding 213 is energized from source 43 through conductors 74 and 75. Slider 207 is actuated by a manual knob 214.

Slider 203 of resolver 197 is connected to a center tap 215 on the linear resistance winding 216 of a voltage divider 217 having a slider 220. The terminals 221 and 222 of winding 216 are energized from the secondary winding 223 of a transformer 224 whose primary winding 225 is energized from source 43 through conductors 74 and 75. Slider 220 is actuated by a manual knob 226.

Sliders 202 and 203 of resolver 197 are unitarily actuated by a shaft 227 driven by a motor 232. Motor 232 is connected by a suitable cable 233 to a motor control amplifier 234 having power terminals 235 and 236, energized from source 43 through conductors 74 and 75, and input terminals 237 and 240 energized from the secondary winding 241 of a transformer 242 having a primary winding 243 with terminals 244 and 245.

The $U_x$ component 33 of computer 26 includes a transformer 250 having a primary winding 251, with terminals 252 and 253, and a secondary winding 254. Terminal 252 is connected to slider 65 of voltage divider 64. Terminal 253 is connected by a conductor 258 to slider 131 of voltage divider 130. Secondary winding 254 of transformer 250 is connected to the input terminals 255 and 256 of an unloading amplifier 257, having output terminals 260 and 261, and power terminals 262 and 263 energized from source 43 through conductors 74 and 75. Output terminals 260 and 261 are connected to the terminals 264 and 265 of the winding 266 of a resolver 267 having sliders 270, 271, 272, and 273. Winding 266 is provided with a center tap 274, which is grounded. Resolver 267 is generally like resolver 55, but specifically slightly different.

Sliders 270 and 271 are unitarily actuated by the shaft 152 driven by motor 155. Sliders 272 and 273 are unitarily actuated by the shaft 90 driven by motor 93. Slider 271 is connected to resistor 176 by conductor 271'. Slider 272 is connected to terminal 108 of secondary winding 106.

The $U_y$ component 34 of computer 26 includes a transformer 275 having a primary winding 276, with terminals 277 and 280, and a secondary winding 281. Terminal 277 is connected to slider 81 of voltage divider 80. Terminal 280 is connected by a conductor 282 to slider 143 of voltage divider 142. Secondary winding 281 of transformer 275 is connected to the input terminals 283 and 284 of an unloading amplifier 288 having output terminals 285 and 286, and power terminals 287 and 290 energized from source 43 through conductors 74 and 75. Output terminals 285 and 286 are connected to the terminals 291 and 292 of the winding 293 of a resolver 294 like resolver 267, having sliders 295, 296, 297, and 300. Winding 293 is provided with a center tap 301, which is grounded.

Sliders 295 and 296 are unitarily actuated by the shaft 152 driven by motor 155. Sliders 297 and 300 are unitarily actuated by the shaft 90 driven by motor 93. Slider 296 is connected to resistor 180 by conductor 296'. Slider 297 is connected to terminal 109 of secondary winding 106.

The $R_x$ component 35 of computer 26, includes a transformer 303 having a primary winding 304, with terminals 305 and 306, and a secondary winding 307. Terminal 305 is connected to slider 207 of voltage divider 206. Terminal 306 is connected by conductor 258 to slider 131 of voltage divider 130. Secondary winding 307 of transformer 303 is connected to the input terminals 310 and 311 of an unloading amplifier 312 having output terminals 313 and 314, and power terminals 315 and 316 energized from source 43 through conductors 74 and 75. Output terminals 313 and 314 are connected to the terminals 317 and 320 of the winding 321 of a resolver 322 like resolver 267, having sliders 323, 324, 325, and 326. Winding 321 is provided with a center tap 327, which is grounded.

Sliders 323 and 324 are unitarily actuated by the shaft 152 driven by motor 155. Sliders 325 and 326 are unitarily actuated by the shaft 227 driven by motor 232. Slider 324 is connected to resistor 177. Slider 325 is connected to terminal 244 of primary winding 243.

The $R_y$ component 36 of computer 26 includes a transformer 330 having a primary winding 331, with terminals 332 and 333, and a secondary winding 334. Terminal 332 is connected to slider 220 of voltage divider 217. Terminal 333 is connected by conductor 282 to slider 143 of voltage divider 142. Secondary winding 334 of transformer 330 is connected to the input terminals 335 and 336 of an unloading amplifier 337 having output terminals 340 and 341, and power terminals 342 and 343 energized from source 43 through conductors 74 and 75. Output terminals 340 and 341 are connected to the terminals 344 and 345 of the winding 346 of a resolver 347 like resolver 267, having sliders 350, 351, 352, and 353. Winding 346 is provided with a center tap 354, which is grounded.

Sliders 350 and 351 are unitarily actuated by the shaft 152 driven by motor 155. Sliders 352 and 353 are unitarily actuated by the shaft 227 driven by motor 232. Slider 351 is connected to resistor 181. Slider 352 is connected to terminal 245 of secondary winding 243.

The $D_0$ component 37 of computer 26 includes a motor 355 having an output shaft 52 which provides inputs to differentials 193 and 51. Motor 355 is energized through a cable 356 from a motor control amplifier 357 having input terminals 360 and 361, and power terminals 362 and 363 energized from source 43 through conductors 74 and 75. Input terminal 361 is grounded. Input terminal 360 is connected to a summation terminal 364, to which are connected a plurality of resistors 365, 366, 367, 370, 371, 372, 373, and 374.

Resistors 365 and 366 are connected respectively to sliders 323 and 326 of resolver 322. Resistors 367 and 370 are connected by conductors 367' and 370' respectively to sliders 273 and 270 of resolver 267. Resistors 371 and 372 are connected respectively to sliders 350 and 353 of resolver 347. Resistors 373 and 374 are connected by conductors 373' and 374' respectively to sliders 300 and 295 of resolver 294.

Resolvers 55, 121, 197, 267, 294, 322, and 347 are portions of a single mechanical unit illustrated in FIGURE 6. The output shaft 92 from motor 93 is connected through gearing 390 and shaft 391 to drive sliders 60 and 61 of resolver 55 and sliders 272 and 273 of resolver 267, and through gearing 392 and shaft 393 to drive sliders 297 and 300 of resolver 294. Shafts 92, 391, and 393 and gearings 390 and 392 comprise mechanical connection 90 of FIGURE 4.

The output shaft 153 from motor 155 is connected through gearing 395 and shaft 396 to drive sliders 270 and 271 of resolver 267 and sliders 295 and 296 of resolver 294, through gearing 397 and shaft 400 to drive sliders 323 and 324 of resolver 322 and sliders 350 and 351 of resolver 347, and through gearing 401 and shaft 402 to drive sliders 124 and 125 of resolver 121. Shafts 153, 396, 400, and 402 and gearings 395, 397, and 401 comprise mechanical connection 152 of FIGURES 4 and 5.

The output shaft 230 from motor 232 is connected through gearing 404 and shaft 405 to drive sliders 202 and 203 of resolver 197 and sliders 325 and 326 of resolver 322, and through gearing 406 and shaft 407 to drive sliders 352 and 353 of resolver 347. Shafts 230, 405, and 407 and gearings 404 and 406 comprise mechanical connection 227 of FIGURE 5.

As an illustration of the structure of the resolvers making up this unit, further details of resolver 267 are shown in FIGURE 7. A form 413 of insulating material carries a linear winding 266 of very fine resistance wire: this form may be flat, but is preferably somewhat thicker at its center than at the edges over which the wire passes, since the winding is more firmly held by a form of this section. Winding 266 has a center tap 274, and is mounted so that the axes of rotation of the sliders 270, 271, 272, and 273 which contact it are aligned with the center tap. It will be apparent that as slider 272 for example moves in a circle across winding 266, the component of its movement parallel to the direction of the wires in the winding produces a negligible change in the voltage between the slider and the center tap: this may be disregarded, and the voltage in question may be considered as influenced only by the component of the movement of the slider normal to the direction of the wire.

It will be observed in FIGURE 6 that slider 272 makes connection between winding 266 of resolver 267 and a slip ring 410 carried on a fixed insulating member 411, and that slider 273 makes similar connection between winding 266 and a second slip ring 412 carried by member 411. Throughout this resolver structure each slider is provided with similar means for making continuous connection thereto: individual reference numerals have not been applied to the remaining slip rings to avoid needless complication of the drawing.

Sliders 270 and 271 engage one face of winding 266, and sliders 272 and 273 engage the other face of the winding. Sliders 270 and 271 are shown to be spaced by 90° about their axis of rotation, and sliders 272 and 273 are similarly spaced. The length of winding 266 is shown to be equal to twice the radius of the movement of the sliders: this may be accomplished simply, in practice, by making the winding too long originally, and then short circuiting the unwanted turns with solder along the edges of the winding.

A voltage of magnitude $U_x$ is impressed across the terminals 264 and 265 of winding 266, and the voltages between the sliders and center tap 274 are found to be trigonometric functions of the angles through which the sliders are rotated, measured counterclockwise, as seen in FIGURE 7, from the direction of the line extending from the center of the winding to center tap 274.

Sliders 272 and 273 are rotated through an angle $b_2$. When this angle is zero, the voltage from slider 272 to center tap 274 is zero: when $b_2$ is 90°, the voltage is $U_x$, and in general the voltage is $U_x \sin b_2$. Similarly, because of the 90° spacing between sliders 272 and 273, the voltage between the latter slider and center tap 274 is in general $U_x \cos b_2$.

Sliders 271 and 270 are rotated through an angle $b_0$, so that the voltages between their sliders and center tap 274 are respectively $U_x \sin b_0$ and $U_x \cos b_0$. The operation of the other resolvers is in every way similar to that of resolver 267 just described.

In initially setting up the resolver assembly shafts 391, 393, 396, 400, 402, 405, and 407 are disengaged from their driving gears. Sliders 61, 125, 203, 271, 272, 295, 300, 324, 325, 350, and 353 are set at zero positions in which they are between and aligned with their respective center taps and the centers of their windings. Sliders 60, 124, 202, 270, 273, 296, 297, 323, 326, 351, and 352 are 90° in advance of the positions of the sliders just listed, the direction of rotation of each shaft resulting in an increase in the angle being considered positive. After all these adjustments are made the shafts can be reengaged with their driving gears, so that the sliders can be positioned by motors 93, 155, and 232, and the resolvers are ready to perform their functions as given in FIGURES 4 and 5.

Means must be provided for making practical use of the device thus far disclosed. The computer can be used either as an indicating device for keeping a human pilot informed as to the accuracy with which he is making good an assigned path, or as a controlling device, in cooperation with an automatic pilot and a scheduling computer, to keep the craft on an assigned track and to ensure its movement at a scheduled ground speed. It is also sometimes desired to coordinate the movement of the craft, not with the Y-axis of the coordinates, but with a line parallel thereto but spaced therefrom.

Means for accomplishing all these functions are clearly disclosed in my copending application 33,608, filed June 17, 1948, now Patent No. 2,787,428, and assigned to the assignee of the present application. Although the same means may be used with the computer and radio instruments disclosed, the combinations resulting therefrom are not the same, but are new and patentable, and invention of this scope is specifically asserted here.

If the system is to be used only for guidance along an assigned track it is necessary only to connect a center-zero phase-sensitive voltage-responsive instrument 420 between conductor 258 and ground, as shown in FIGURE 4. A suitable instrument for this purpose is disclosed in my copending application referred to above. The voltage applied to the instrument is a measure of the X-coordinate of the position of the craft, $x_p$ in FIGURE 2, as will presently be explained. A similar instrument 421 may be connected between conductor 282 of FIGURE 4 and ground, where it is supplied with a voltage that is a measure of the Y-coordinate of the position of the craft, $y_p$ in FIGURE 2. Thus there are provided indications of the distance of the craft from its destination, measured parallel to the desired track, and of its departure from the track in a direction normal thereto. If it is desired to fly along the Y-axis, $x_p$ is a measure of the craft's off-track distance.

If the system is to be used for controlling the movement of a craft, it is necessary that modifications be made as shown in FIGURES 8 and 9, which illustrate respectively the cross-track and along-track portions of the complete control system. FIGURE 8 also shows means enabling the craft to follow a course parallel to the Y-axis instead of following the Y-axis itself.

In FIGURE 8 there is shown a transformer 422 having a primary winding 423, energized from source 43 through conductors 74 and 75, and a secondary winding 424 having a center tap 425 and a plurality of further taps 526. Taps 425 and 426 are connected to the fixed contacts 427 of a tap switch 430 having a switch arm 431. Center tap 425 is connected to conductor 258 of FIGURE 4: its voltage with respect to ground is accordingly that of conductor 258, which voltage is a measure of $x_p$. Switch arm 431 is actuated by a manual knob 432. The voltages between center tap 425 and the successive taps on each side of it increase in steps of .5 volts.

Switch arm 431 is connected to a coupling unit 433, which derives from the voltage between the switch arm and ground a signal suitable for controlling an automatic pilot 434. These components may be as described in my copending application referred to above.

In FIGURE 9 there is shown a transformer 435 having a secondary winding 436 and a primary winding 437 energized from source 43 through conductors 74 and 75. Secondary winding 436 energizes the linear winding 440 of a voltage divider 441 having a slider 442 and a center tap 443. Slider 442 is connected to conductor 282 of FIGURE 4, and its voltage with respect to ground is thus a measure of $y_p$. Center tap 443 is connected to an air-speed controller 444 for adjusting the throttles or elevators, or both, of the craft to bring about a desired air speed which may be set into the instrument by a knob 452.

Slider 442 may be operated by a manual knob 445, so that any desired setting of the slider on the winding may be obtained, to permit spot checking of the along-track position of the craft as desired, in the absence of continuous air speed control to maintain schedule. The latter control is of course preferable and for that purpose the slider is actuated by a mechanical input 446 from a scheduling computer 447 having a knob 450 to be set in accordance with the value of $y_g$, the Y-coordinate of the point at which the flight begins, and a knob 451 to be set in accordance with the assigned ground speed. The voltage between slider 442 and center tap 443 in either case is always equal to the distance $y_t$ which the craft should be from its destination. Since the voltage between conductor 282 and ground is a measure of the actual distance $y_p$ of the craft from its destination, the voltage input to controller 444 is the difference $y_d$ between them, which is the craft's off-schedule distance. Air-speed controller 444 and schedule distance computer 447 may be as described in my copending application referred to above.

The distance-to-destination indicator 421 can also be used in this more complete embodiment of the invention, as shown in FIGURES 4 and 9. It is also desirable to provide an off-track distance indicator 448 as shown in FIGURES 4 and 8, and it may also be desirable to provide a further indicator 449 for giving a continual reading of the distance by which the craft is ahead of or behind its schedule.

The values of $x_0$, $x_1$, and $x_2$ may be anywhere within a range of plus or minus 500 miles, and those of $y_0$, $y_1$, and $y_2$, within plus or minus 1,000 miles. $D_0$, $D_1$, $D_2$, and $y_g$ may vary up to 1,500 miles each, while $x_t$ ordinarily varies by plus or minus 30 miles, and $y_t$ should be capable of adjustment up to 1,000 miles. Since, for convenience, it is desired to perform the major operations in the computer on a scale of .1 volt per mile, the voltages appearing across the various potentiometer and resolver windings must have values corresponding to the required ranges. It is convenient to supply these voltages directly from transformer secondaries.

The trigonometrically varying voltages from resolver 55 are based on half the voltage supplied by voltage divider 47 whose output must accordingly be on a double scale. Slider 48 moves from one end of winding 46 to the other for a range of $D_2$ of 1,500 miles: the secondary voltage of transformer 40 is thus 300 volts, and the same is true of those of transformers 107 and 182. The secondary voltage of each of transformers 71, 135, 212 is 100 volts, that of each of transformers 85, 147, and 224 is 200 volts, and that of transformer 424 (FIGURE 8) is 6 volts, and that of transformer 435 is 200 volts.

*Operation*

The operation of the system will now be described. The proper relation between motor 355, shafts 50, 52, and 192, sliders 48, 116, and 191, and decometers 22 and 23 must initially be established: this may be done on the ground, as follows. The automatic pilot is disconnected from the computer and is deenergized, as are the computer and the Decca receiver. Mechanical connections 24 and 25 between differentials 193 and 51 and decometers 22 and 23 respectively are completed, regardless of the residual indications of the decometers. Sliders 48, 116, and 191 are loosened on shafts 50, 52, and 192 and are set at the zero ends of their windings, next to terminals 44, 112, and 185 respectively.

The pointers of decometer 22 are now adjusted manually to the reading they would give if the receiver were located midway along the line $S_0S_1$, and those of decometer 23 are manually adjusted to the reading they would give if the receiver were located midway along the line $S_0S_2$. These readings may or may not coincide with alignment of the principal pointers of the decometers with the zeros of their scales, depending on delays in the ground equipment, etc. They do, however, coincide with values of zero for $d_1$ and $d_2$, the actual distance differences for craft located midway between the stations of the respective pairs.

Manual setting of the decometers supplies inputs to differentials 51 and 193: since shaft 52 is held stationary by motor 355, which may also be clamped if necessary, this results in the positioning of shafts 50 and 192 only. Sliders 48, 116, and 191 are now fastened to their respective shafts again, and an index 416 on shaft 52 is set so as to coincide with zero on a suitably calibrated scale 417 fixed with respect thereto.

The proper interrelation between receiver 20 and computer 26 has now been established. The system is next coordinated with the conditions of a particular flight: this requires determining the values of $x_0$, $x_1$, $x_2$, $y_0$, $y_1$, and $y_2$, so that knobs 137, 214, 78, 151, 226, and 87 may be set accordingly. The values are determined from a chart of the area being traversed, complete with hyperbolic locus overprints.

Suppose the craft is to take off from G and travel to D along a straight line path—which is a great circle path over the actual surface of the earth—at a scheduled ground speed of 210 miles per hour. The pilot locates points G and D on his chart and draws the line joining them. He next draws the Y-axis parallel to the line GD and spaced from it by some assigned multiple of five miles. The line perpendicular to the Y-axis and passing through D determines the origin of the Cartesian system of coordinates upon which the computer is based. A transparent coordinate grid in the proper scale may now be laid over the chart, with its axes determined as just described, and the coordinates of points $S_0$, $S_1$, and $S_2$ may be determined and recorded. Alternatively, their coordinates may be calculated from known geodesic data. The values of the distance differences $d_1$ and $d_2$ at the point at which the adjustment is being carried on are determined by reference to the hyperbolic locus overprints in terms of decometer reading. Alternatively, these values can also be determined by calculation from geodesic data.

It is assumed that the Decca ground stations are in continuous operation. Suitable energization of amplifiers, etc., sufficiently in advance of their use to insure stable operation thereof is also assumed herein to be provided by any conventional means, not shown. The coordination of the system is continued by energizing source 43, thus supplying alternating voltage to transformers 40, 71, 85, 107, 135, 147, 182, 212, and 224 and to amplifiers 157, 234, 97, 257, 288, 312, 337, and 357. Shafts 90, 152, and 227, and hence the sliders of the resolvers, are in fortuitous positions, but since sliders 48, 116, and 191 are at their zero positions, there is no energization of the resolvers and hence no energization of transformers 250, 275, 303, and 330 from the resolvers. Knobs 78, 87, 137, 151, 214, and 226 are now set to the values of the coordinates of the ground stations, which supplies voltage outputs from dividers 64, 80, 130, 142, 206, and 217, respectively. For reasons presently to be pointed out, none of these voltages is zero: the $x$ voltages must also all be of the same phase, and the $y$ voltages are ordinarily all of the same phase as well. The computer is now set up and energized to solve the problem for which it was designed. If the decometers have not been moved from the positions to which they were set during the alignment process described above, then their inputs represent the special case where $d_1$ and $d_2$ are both equal to zero.

The locus of all points where $d_1=0$ is the perpendicular bisector of the line $S_0S_1$, and that of all points where $d_2=0$ is the perpendicular bisector of the line $S_0S_2$. The computer proceeds to determine the coordinates of the point of intersection of these bisectors according to the equations previously given: the exact mode of operation of the computer will be described below. Since $D_0$ has been set to zero and $d_1$ and $d_2$ are also zero, the points Q, R, and U are at first coincident with $S_0$, $S_1$, $S_2$, and the discrepancy vectors at this time have the magnitudes and directions of the lines $S_0S_1$ and $S_0S_2$, regardless of the values of $b_0$, $b_1$, and $b_2$. As soon as $D_0$ takes some finite value, however, the discrepancy vectors are affected in length and direction by the values of these angles. Ultimately the computer comes to rest.

Thus far, $d_1$ and $d_2$ have been maintained in the settings to which they were manually adjusted because the Decca receiver 20 has not been energized. This is now done, and the principal pointers of the decometers advance to positions determined by the location of the receiver with respect to the nearest lines of zero phase angle. Neither principal pointer moves more than 360°, and in general neither will move through more than 180° since they can move in either direction. Changes in the positions of sliders 48, 116, and 191 follow from this operation of members 24 and 25, and the computer comes to rest in a new position.

It is now necessary to complete the coordination of the system by manually adjusting decometers 22 and 23 so that the subordinate pointers identify which of the many possible diamond-shaped areas the receiver is actually located in. The decometer readings of the point at which the aircraft is have been determined as described previously; the normal drive of each decometer is overpowered and the decometer set so that the subordinate pointers as well as the principal pointer give correct indications. When this is done the system is ready for use, and remains so as long as the craft does not change its position by a distance as great as half a wave length while the system is not in operation. For example a craft can land at an airport, deenergize the Decca system and the computer, remain unused for an indefinite period, and yet be ready for use without recoordination between computer and receiver if the ensuing take-off is from the same runway and the same set of ground stations is used.

Now consider the condition of a craft which arrived at G sometime previously, under control of the inventive system, and which has remained in the hangar for several days. When it is desired to resume flight under control of the Decca system, the craft is rolled out of the hangar to a position within a quarter wave length of that when the system was last turned off, and the computer, receiver, and automatic pilot are again energized.

New values for the X- and Y- coordinates of the transmitting stations must be set into the computer. This is because the destination of the preceding flight has become the departure of the contemplated flight, and there is a new destination to be reached with which the origin of the coordinates must coincide. For purposes of illustration let it be assumed tat the flight from G to D is one which the pilot makes very frequently. Under such conditions he may have found it practical to compute the rectangular coordinates of the ground stations on D as an origin by spherical trigonometry thus attaining more accurate values than can be obtained by reading a chart.

The values of these coordinates whether computed or scaled off, can be set into the computer by means of knobs 137, 214, 78, 151, 226, and 87, as soon as the computer and the Decca receiver are in operation. Knobs 432, 450, 451, and 452 can also be set for the proper values of $x_t$, $y_g$, assigned ground speed, and assumed air speed respectively. When the computer has come to equilibrium the system is fully ready for flight: no other changes in setting or readjustment of any sort are required beyond the normal trimming of the ship prior to initiation of control from the automatic pilot.

The positions at which motors 93, 155, and 232 last stopped determine the settings of resolvers 55, 121, 197, 267, 294, 322, and 347. The inputs from telemetric systems 24 and 25 determine the positions of sliders 48 and 191, compared to that of slider 116.

The output of transformer 40 is 300 volts. The position of slider 48 has the same relation to $D_2'$ that the whole length of winding 46 has to 1,500 miles, so that the voltage impressed across resolver 55 is numerically equal to $$\frac{2D_2'}{10}$$

The voltage between either end of winding 56 and center tap 57 is equal to $$\frac{D_2'}{10}$$

and of this voltage a first portion, determined by the position of slider 60, appears between the slider and ground. This portion is of magnitude $$\frac{1}{10}D_2'\cos b_2$$

since slider 60 is rotated by motor 93 through an angle $b_2$ and is positioned to give a cosine output. Knob 78 is set to the X-coordinate $x_2$ of station $S_2$, so that the displacement of slider 65 from center tap 62 has the same relation to the actual distance $x_2$ as does the total voltage of 100 volts between terminals 66 and 67 to the total available range of 1000 miles. The voltage from slider 65 to center tap 62 is thus numerically equal to $$\frac{x_2}{10}$$

and that between terminal 252 of transformer 250 and ground is equal to $$\frac{1}{10}(x_2 + D_2' \cos b_2)$$

which Equation 5 defines as $$\frac{x_u}{10}$$

A second portion of the voltage between either end of winding 56 and center tap 57, determined by the position of slider 61, appears between the slider and ground. This voltage is of magnitude $$\frac{1}{10}(D_2' \sin b_2)$$

since slider 61 is rotated by motor 93 through an angle $b_2$, and since slider 61 is adjusted to give a sine output. Knob 87 is set to the Y-coordinate $y_2$ of station $S_2$, so that the displacement of slider 81 from center tap 76 has the same relation to the actual distance $y_2$ as does the total voltage of 200 volts between terminals 82 and 83 to the total available range of 2000 miles. The voltage from slider 81 to center tap 76 is thus equal to $$\frac{y_2}{10}$$

and that between terminal 277 of transformer 275 and ground is $$\frac{1}{10}(y_2 + D_2' \sin b_2)$$

which Equation 8 defines as $$\frac{y_u}{10}$$

The output of transformer 107 is 300 volts. The position of slider 116 has the same relation to $D_a$ that the whole length of winding 114 has to 1500 miles, so that the voltage impressed across resolver 121 is equal to $$\frac{2D_a}{10}$$

The voltage between either and of winding 122 and center tap 123 is equal to $$\frac{D_a}{10}$$

and of this voltage a first portion, determined by the position of slider 124, appears between the slider and ground. This portion is of magnitude $$\frac{1}{10}(D_a \cos b_0)$$

since slider 124 is rotated by motor 155 through an angle $b_0$ and since slider 124 is adjusted to give a cosine output. Knob 137 is set to the X-coordinate $x_0$ of station $S_0$, so that the displacement of slider 131 from center tap 126 has the same relation to the actual distance $x_0$ as does the total voltage of 100 volts between terminals 132 and 133 to the total available range of 1000 miles. The voltage from slider 131 to center tap 126 is thus equal to $x_0$, and that between terminal 253 of transformer 250 and ground is equal to $$\frac{1}{10}(x_0 + D_a \cos b_0)$$

which Equation 3 defines as $$\frac{x_q}{10}$$

Terminal 306 of transformer 303 is at the same potential.

A second portion of the voltage between either end of the winding 122 and center tap 123, determined by the position of slider 125, appears between the slider and ground. This voltage is of magnitude $$\frac{1}{10}(D_a \sin b_0)$$

since slider 125 is rotated by motor 155 through an angle $b_0$ and since slider 125 is adjusted to give a sine output. Knob 151 is set to the Y-coordinate $y_0$ of station $S_0$, so that the displacement of slider 143 from center tap 140 has the same relation to the actual distance $y_0$ as does the total voltage of 200 volts between terminals 144 and 145 to the total available range of 2000 miles. The voltage from slider 143 to center tap 140 is thus equal to $$\frac{y_0}{10}$$

and that between terminal 280 of transformer 275 and ground is $$\frac{1}{10}(y_0 + D_a \sin b_0)$$

which Equation 6 defines as $$\frac{y_q}{10}$$

Terminal 333 of transformer 330 is at the same potential.

The output of transformer 182 is 300 volts. The position of slider 191 has the same relation to $D_1'$ as the whole length of winding 187 has to 1500 miles, so that the voltage impressed across resolver 197 is equal to $$\frac{2D_1'}{10}$$

The voltage between either end of winding 200 and center tap 201 is equal to $$\frac{D_1'}{10}$$

and of this voltage a first portion, determined by the position of slider 202, appears between the slider and ground. This portion is of magnitude $$\frac{1}{10}(D_1' \cos b_1)$$

since slider 202 is rotated by motor 232, through an angle $b_1$ and since slider 202 is adjusted to give a cosine output. Knob 214 is set to the X-coordinate $x_1$ of station $S_1$, so that the displacement of slider 207 from center tap 204 has the same relation to the actual distance $x_1$ as does the total voltage of 100 volts between terminals 208 and 210 to the total available range of 1000 miles. The voltage from slider 207 to center tap 204 is thus equal to $$\frac{x_1}{10}$$

and that between terminal 305 of transformer 303 and ground is equal to $$\frac{1}{10}(x_1 + D_1' \cos b_1)$$

which Equation 4 defines as $$\frac{x_r}{10}$$

A second portion of the voltage between either end of winding 200 and center tap 201 determined by the position of slider 203 appears between the slider and ground. This voltage is of magnitude $$\frac{1}{10}(D_1' \sin b_1)$$

since slider 203 is rotated by motor 232 through an angle $b_1$ and since slider 203 is adjusted to give a sine output. Knob 226 is set to the Y-coordinate $y_1$ of station $S_1$, so that the displacement of slider 220 from center tap 215 has the same relation to the actual distance $y_1$ as does the total voltage of 200 volts between terminals 221 and 222 to the total available range of 2000 miles. The voltage from slider 220 to center tap 215 is thus equal to $$\frac{Y_1}{10}$$

and that between terminal 332 of transformer 330 and ground is $$\frac{1}{10}(y_1 + D_1' \sin b_1)$$

which Equation 7 defines as $$\frac{Y_r}{10}$$

From the foregoing it will be apparent that, according to Equations 3 to 8, voltages equal to $$\frac{x_r}{10} \text{ and } \frac{y_r}{10}$$

appear between terminals 305 and 332 and ground, voltages equal to $$\frac{x_u}{10} \text{ and } \frac{y_u}{10}$$

appear between terminals 252 and 277 and ground, a voltage equal to $$\frac{x_q}{10}$$

appears between terminals 253 and 306 and ground, and a voltage equal to $$\frac{y_q}{10}$$

appears between terminals 280 and 333 and ground. The current in primary winding 251 and the voltage induced in secondary winding 254 are proportional to $x_u - x_q$, and therefore, according to Equation 11, to $U_x$. Similarly the voltages in windings 281, 307, and 334 are proportional to $U_y$, $R_x$, and $R_y$ respectively, according to Equations 12, 9, and 10. The secondary windings are connected to impress the induced voltages on amplifiers 257, 288, 312, and 337 which have high input impedances: the transformers are hence effectively without load.

The voltage of conductor 258 with respect to ground is the average of the voltages at terminals 252 and 305, and the voltage of conductor 282 with respect to ground is the average of the voltages at terminals 277 and 332. These average voltages are not related in any simple fashion to the necessary corrections in the craft's movement, but since the craft is not yet controlled by the computer no harmful effect is exerted thereby.

The "scale" of .1 volt per mile does not extend beyond the components thus far described: a new scale is required and is determined by the gain in the amplifiers just listed, which should be electrically interchangeable so that the scale is the same throughout the rest of the circuit.

A voltage proportional to $U_x$ is impressed by amplifier 257 on the winding of resolver 267. Of this voltage a portion, determined by the position of slider 272, is supplied to terminal 108 of transformer 105. This portion is proportional to $U_x \sin b_2$, since slider 272 is rotated by motor 93 through an angle $b_2$, and since slider 272 is adjusted to give a sine output. In a similar fashion a voltage of magnitude $U_x \cos b_2$ is supplied from slider 273 through summing resistor 367 to summation terminal 364.

Of the voltage on the winding of resolver 267 a further portion, determined by the position of slider 271 is supplied through summing resistor 176 to terminal 174 of transformer 166. This portion is porportional to $U_x \sin b_0$, since slider 271 is rotated by motor 155 through an angle $b_0$ and since slider 271 is adjusted to give a sine output. In a similar fashion a voltage proportional to $U_x \cos b_0$ is supplied from slider 270 through a summing resistor 370 to summation terminal 364.

A voltage proportional to $U_y$ is impressed by amplifier 288 on the winding of resolver 294. Of this voltage, a portion, determined by the position of slider 297 is supplied to terminal 109 of transformer 105. This portion is of magnitude $U_y \cos b_2$, since slider 297 is rotated by motor 93 through an angle $b_2$ and since slider 297 is adjusted to give a cosine output. In a similar fashion a voltage of magnitude $U_y \sin b_2$ is supplied from slider 300 through summing resistor 373 to summation terminal 364.

Of the voltage on the winding of resolver 294 a portion, determined by the position of slider 296, is supplied through summing resistor 180 to terminal 175 of transformer 167. This portion is of magnitude $U_y \cos b_0$, since slider 296 is rotated by motor 155 through an angle $b_0$ and since slider 296 is adjusted to give a cosine output. In a similar fashion a voltage of magnitude $U_y \sin b_0$ is supplied from slider 295 through summing resistor 374 to summation terminal 364.

A voltage proportional to $R_x$ is impressed by amplifier 312 on the winding of resolver 322. Of this voltage a portion, determined by the position of slider 325, is supplied to terminal 244 of transformer 242. This portion is of magnitude $R_x \sin b_1$, since slider 325 is rotated by motor 232 through an angle $b_1$ and since slider 325 is adjusted to give a sine output. In a similar fashion a voltage of magnitude $R_x \cos b_1$ is supplied from slider 326 through summing resistor 366 to summation terminal 364.

Of the voltage on the winding of resolver 322 a further portion, determined by the position of slider 324, is supplied through summing resistor 177 to terminal 174 of transformer 166. This portion is of magnitude $R_x \sin b_0$, since slider 324 is rotated by motor 155 through an angle $b_0$ and since slider 324 is adjusted to give a sine output. In a similar fashion a voltage of magnitude $R_x \cos b_0$ is supplied from slider 323 through summing resistor 365 to summation terminal 364.

A voltage proportional to $R_y$ is impressed by amplifier 337 on the winding of resolver 347. Of this voltage, a portion determined by the position of slider 352 is supplied to terminal 245 of transformer 242. This portion is of magnitude $R_y \cos b_1$, since slider 352 is rotated by motor 232, through an angle $b_1$ and since slider 352 is adjusted to give a cosine output. In a similar fashion a voltage of magnitude $R_y \sin b_1$ is supplied from slider 353 through a summing resistor 372 to summation terminal 364.

Of the voltage on the winding of resolver 347 a further portion, determined by the position of slider 351, is supplied through summing resistor 181 to terminal 175 of transformer 167. This portion is of magnitude $R_y \cos b_0$, since slider 351 is rotated by motor 155 through an angle $b_0$ and since slider 351 is adjusted to give a cosine output. In a similar fashion a voltage of magnitude $R_y \sin b_0$ is supplied from slider 350 through summing resistor 371 to summation terminal 364.

The voltage at terminal 108 of transformer 105 is $U_x \sin b_2$, and that at terminal 109 is $U_y \cos b_2$. The current in primary winding 106 and the voltage induced in secondary winding 104 are proportional to the difference between the voltages at terminals 108 and 109, that is, to $U_y \cos b_2 - U_x \sin b_2$, so that the voltage impressed on amplifier 97 for controlling motor 93 is $V_2$ as defined in Equation 15.

The voltage at terminal 244 of transformer 242 is $R_x \sin b_1$, and that at terminal 245 is $R_y \cos b_1$. The current in primary winding 243 and the voltage induced in secondary winding 241 are proportional to the difference between the voltages at terminals 244 and 245, that is, to $R_y \cos b_1 - R_x \sin b_1$, so the voltage impressed on amplifier 234 for controlling motor 232 is $V_1$ as defined in Equation 14.

Voltages proportional to $U_x \sin b_0$ and $R_x \sin b_0$ are applied, through parallel summing resistors 176 and 177, between terminal 174 of primary winding 170 and ground. Each causes the flow of proportional current in primary winding 170. The induced voltage in secondary winding 164 is hence proportional to $R_x \sin b_0 + U_x \sin b_0$. Similarly, voltages proportional to $U_y \cos b_0$ and $R_y \cos b_0$ are applied, through parallel summing resistors 180 and 181, between terminal 175 of primary winding 171 and ground. Each causes the flow of a proportional current in primary winding 171. The induced voltage in secondary winding 165 is hence proportional to $$R_y \cos b_0 + U_y \cos b_0$$

The secondary windings are connected in opposition to amplifier 157, so that the voltage applied to the amplifier for controlling motor 155 is proportional to $(R_y \cos b_0 + U_y \cos b_0) - (R_x \sin b_0 + U_x \sin b_0)$, which is Equation 13 rearranged. Accordingly, the control on motor 155 is proportional to $V_0$ as defined in Equation 13.

Summing resistors 365, 366, 367, 370, 371, 372, 373, and 374 and summation terminal 364 comprise a parallel summing network such that the voltage between terminal 364 and ground is proportional to the sum of the voltages applied to the summing resistors. In the order given above, these voltages are proportional to $R_x \cos b_0$, $R_x \cos b_1$, $U_x \cos b_2$, $U_x \cos b_0$, $R_y \sin b_0$, $R_y \sin b_1$, $U_y \sin b_2$, and $U_y \sin b_0$. The sum of these terms, as given in Equation 16 is proportional to $V_d$, which is the correction to be applied to motor 355.

Whenever $V_1$ is not equal to zero, motor 232 operates in a direction to reduce $V_1$ by chaning sliders 202, 203, 325, 326, 352, and 353. Whenever $V_2$ is not equal to zero, motor 93 operates in a direction to reduce $V_2$, by changing sliders 60, 61, 272, 273, 297, and 300. Whenever $V_0$ is not equal to zero, motor 155 operates in a direction to decrease $V_0$, by changing sliders 124, 125, 270, 271, 295, 296, 323, 324, 350, and 351. Whenever $V_d$ is not equal to zero, motor 355 operates in a direction to decrease $V_d$ by changing sliders 48, 116, and 191.

For clearness in illustration the differences between $B_0$ and $b_0$, $B_1$ and $b_1$, $B_2$ and $b_2$, and $D_0$ and $D_a$ in FIGURE 3 have been greatly exaggerated. Such wide divergences can never occur except possibly when the computer is for the first time being set up: after the initial set up is completed, the requirement for continuous operation whenever the craft moves, to maintain coordination between the insrument and the correct one of the grid of points of intersection, insures that no great difference between the elements of any of the above pairs can arise.

Motors 93, 155, 232, and 355 operate as described above until $V_2$, $V_0$, $V_1$ and $V_d$ are simultaneously zero: thereafter the only operation of any of these motors which occurs is that required to readjust the system for changed inputs at 24 and 25 due to movement of the craft—a relatively slow process. Moreover, when the condition of adjustment or balance, that is, the normal condition of the computer, is obtained, terminals 252, 253, 306, and 305 are at the some potential, because $x_q = x_r = x_u = x_p$, and terminals 277, 280, 333, and 332 are also at the same potential, because $y_q = y_r = y_u = y_p$.

The voltage between conductor 258 and ground is thus equal to $x_p$ on the scale of .1 volt per mile. The voltage between center tap 425 and switch arm 431 is $x_t$ on the same scale. The voltage between switch arm 431 and ground, which is impressed on coupling unit 433, is hence $x_p - x_t$, or $x_d$, which is the off-track distance of the craft, The value of $x_d$ is shown on indicator 448: in this case the indication of $x_d$ is without substantial significance, and indicator 420 is omitted from FIGURE 1 accordingly.

The voltage between conductor 282 and ground is equal to $y_p$ on the scale of .1 volt per mile, and is indicated on indicator 421. The voltage between center tap 443 and slider 442 is adjusted by scheduling computer 447 to a value $y_t$ which represents, on the same scale, the schedule distance to desination of the craft. The voltage between center tap 443 and ground, which is impressed on air-speed controller 444, is hence $y_p - y_t$, or $y_d$, which is the off-schedule distance of the craft. The value of $y_d$ is shown on indicator 449.

The navigating computer is now coordinated with the new position of the craft, and any movement which the craft now makes is detected by the Decca receiver which continuously adjusts the computer accordingly. The take-off is normally performed by the human pilot. The bearing of D from G, and the velocity of the prevailing wind at G are known to the pilot, and when he reaches his assigned altitude over G he puts the craft on a generally proper heading for these conditions, turns on scheduling computer 447, and places automatic pilot 434 and air-speed controller 444 in control of the control surfaces and throttle of the craft.

If the craft is on the desired path, the voltage between switch arm 431 and ground is zero, no input reaches the coupling unit, and the automatic pilot maintains its normal stabilizing control of the craft. If the craft is not on the desired path, a voltage appears between switch arm 431 and ground. This voltage is of a first phase if the craft is to the left of the desired path, and of the opposite phase if the craft is on the other side of the desired path. Coupling unit 433 and automatic pilot 434 cooperate to correct the heading of the craft in response to $x_d$, in a direction to bring it back to the desired track, and as this occurs the inputs 24 and 25 change, reducing $x_p$ to the value of $x_t$ so that the craft is on the desired path. By this means any error in the estimate of the cross-track component of wind, and any initial error in the setting of the heading of the craft, are automatically eliminated.

If the craft is on the assigned schedule, that its actual distance from the destination D is the same as its schedule distance at each moment, the voltage between center tap 443 and ground remains zero and no input reaches the air-speed controller, which continues to maintain the air speed at which it was initially set. If the craft is not proceeding according to schedule, a voltage appears between center tap 443 and ground depending in phase on whether the craft is ahead of or behind schedule. Controller 444 is energized thereby to correct the air speed of the craft in proportion to $y_d$, in a direction to bring the craft back on schedule, and as this occurs the inputs 24 and 25 change, reducing $y_p$ to the value $y_t$ and maintain their rates of change the same. By this means any error in the estimate of the along-track component of wind and any initial error in the throttle settings are automatically eliminated.

It should be pointed out that, because of the small scale of suitable charts showing the three stations and their working area, the pilot cannot himself determine the coordinates of the stations on a particular set of axes with the accuracy with which the system thereafter operates. This means that the craft will be accurately following a path whose actual location over the surface of the earth is not known to the same degree of accuracy. For individual flights this is of no consequence, because it is simply necessary to ensure movement of the craft from the neighborhood of one airport to that of another. For scheduled operation of a fleet of craft such uncertainties are more serious. However, if such operations a relatively small number of destinations are all that need be considered, and precise determination of the coordinates of the stations with respect to the axes of the various scheduled flights may better be calculated from geodetic data.

In the foregoing specification I have described means illustrated in the drawings for controlling the movement of a craft so that it follows a selected straight line, in response to signals of a hyperbolic navigation system. I have shown that the control may be exercised either by a graphical computer, which has certain limitations, or by an analytical computer, in which the limitations are largely absent. In connection with the analytical computer I have shown diagrammatically control means of which embodiments are illustrated in detail in a copending application, for making use of the output of the computer to control the movement of the craft.

The analytical computer is shown to function by determining the components, parallel to the axes of a selected coordinate system, of discrepancy vectors joining the heads of trial vectors assumed to represent in length and direction the distances and direction from the ground stations of the hyperbolic navigation system to the craft. The computer balances itself by determining components of the discrepancy vectors; those normal to the trial vectors are used to correct the assumed directions, and those parallel thereto are used to correct the assumed lengths.

Numerous objects and advantages of my invention have been set forth in the foregoing description, together with details of the structure and function of the invention, and the novel features thereof. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In a device of the class described, in combination: a movable member whose position is to represent the location of a movable point on a set of coordinate axes; means mounting said member for movement parallel to each of said axes; means actuated by movement of said member parallel to one of said axes for giving an output proportional to the position of said member along one of said axes; a plurality of funicular members acting on said movable member; means for varying the centers of action of said funicular members in accordance with the known positions on said axes of a plurality of fixed points; means responsive to tension in a first of said funicular members for simultaneously varying the lengths of said funicular members; and means independently varying the lengths of others of said funicular members in accordance with the differences between the distances from said movable point to pairs of said known points.

2. In a device of the class described, in combination: a plurality of substantially plane resistance windings each having a center tap; contact means mounted for rotation about the center of at least one surface of each said winding to make continuous electrical connection therewith so that the resistance between said contact means and said center tap is a trigonometric function of the angle of rotation of said contact means from a zero position; means causing movement of said contact means to determine their rotated positions on said windings; means energizing certain of said windings in accordance with the magnitudes of related variable, to give first outputs varying as trigonometric functions of said variables and said angles; means energizing others of said windings in accordance with functions of said first outputs to give second outputs; means changing the values of said related variables in response to one of said second outputs, and means changing the rotated positions of said contact means in response to the rest of said outputs, until a stable condition is reached in which sets of said first outputs are equal at the same time that said second outputs are zero; and control means actuated in accordance with the values of each of said sets of equal first outputs.

3. In a device of the class described, in combination: first means adjustable to give outputs in accordance with coordinates of first, second, and third fixed points; further means adjustable in accordance with an assumed distance from one of said fixed points to a movable point, and with the actual differences between the distance from said movable point to one of said fixed points and the distances from said movable point to others of said fixed points, to supply further outputs proportional to assumed distances from said movable point to said fixed points; means adjustable to modify said further outputs in accordance with assumed directions of said movable point from said fixed points; adjustable computing means deriving, from said first named outputs and said modified outputs, signals representative of the positions of three trial points; motor means for adjusting said computing means to change said derived signals so that they represent trial points having different positions; and means responsive to said signals for causing energization of said motor means whenever said signals do not correspond to coincident trial points so as to bring said trial points into coincidence.

4. In a device of the class described, in combination: first means adjustable to give outputs in accordance with coordinates of first, second, and third fixed points; further means adjustable in accordance with an assumed distance from one of said fixed points to a movable point, and with the actual differences between the distance from said movable point to one of said fixed points and the distances from said movable point to the others of said fixed points, to supply further outputs proportional to assumed distances from said movable point to said fixed points; means adjustable to modify said further outputs in accordance with assumed directions of said movable point from said fixed point; adjustable computing means deriving, from said first named outputs and said modified outputs, signals representative of the positions of three trial points; means deriving from said signals further signals proportional to the components, normal and parallel to said assumed directions, of discrepancy vectors joining said positions; means adjusting said modifying means in accordance with said normal component signals and means adjusting said first named means in accordance with said parallel component signals, to cause said computing means to reduce said discrepancy vectors to zero so that said trial points coincide; and means giving an output proportional to a characteristic of the position of said coincident points.

5. Aircraft navigating apparatus for determining the coordinates of an aircraft on a set of Cartesian axes with respect to which the abscissas and ordinates of first, second, and third ground stations are known, when the differences between the distance from the first ground station to the aircraft and the distances from the other ground stations to the aircraft are also known, comprising, in combination: means adjustable in accordance with an assumed value of the distance from the first ground station to the aircraft; means actuated thereby to supply a voltage which varies in accordance with said assumed distance; means adjustable in accordance with said distance differences; means actuated by said adjustable means to supply voltages which vary in accordance with computed distances from the other ground stations to the aircraft based on said assumed distance; resolving means adjustable in accordance with assumed directions of the aircraft from the ground stations; means energizing said resolving means with said voltages; means adjustable to give voltages which vary in accordance with the known coordinates of the ground stations; means combining said last named voltages with the outputs of said resolvers to provide voltage signals which vary in accordance with the projections, on the axes, of discrepancy vectors connecting assumed positions of the aircraft resulting from said assumed directions and said assumed and computed distances; further resolving means adjustable in accordance with said assumed directions; means energizing said further resolving means with said voltage signals to give output signals therefrom which vary in accordance with the components of said projections taken parallel and normal to said assumed directions; motor means connected to adjust said resolving means; means energizing said motor means in accordance with said normal component signals; further motor means connected to adjust said first named means; and means energizing said further motor means in accordance with said parallel component signals.

6. Aircraft navigating apparatus for determining the coordinates of an aircraft on a set of Cartesian axes with respect to which the abscissas and ordinates of first, second, and third ground stations are known, when the differences between the distance from the first ground station to the aircraft and the distances from the other ground stations to the aircraft are also known, comprising, in combination: means adjustable to give outputs in accordance with the lengths of first, second, and third trial vectors extending in random directions from said ground stations to terminate at assumed positions of the craft; means adjustable to give outputs in accordance with the known coordinates of the ground stations; means adjustable in accordance with said random directions of said trial vectors; computing means, energized with said outputs, for determining the coordinates of the said assumed positions of the craft; means in said computing means giving outputs in accordance with the components, parallel and normal to said trial vectors, of discrepancy vectors joining one of said assumed positions with the others of said assumed positions; and means actuating said first named adjustable means in accordance with said parallel components, and simultaneously actuating said last named adjustable means in accordance with said normal components, in such a fashion as to reduce all said components to zero.

7. Aircraft navigating apparatus for determining the coordinates of an aircraft on a set of Cartesian axes with respect to which the abscissas and ordinates of first, second, and third ground stations are known, when the differences between the distance from the first ground station to the aircraft and the distances from the other ground stations to the aircraft are also known, comprising, in combination: means adjustable to give outputs in accordance with the lengths of first, second and third trial vectors extending in random directions from the ground stations to terminate at assumed positions of the craft; means adjustable to give outputs in accordance with the known coordinates of the ground stations; first, second, and third further means adjustable respectively in accordance with the directions of said trial vectors; computing means, energized in accordance with said outputs, for determining the coordinates of said assumed positions of the craft; means in said computing means for giving outputs in accordance with the components, parallel and normal to said first and second trial vectors, of the discrepancy vector joining the heads thereof, and in accordance with the components, parallel and normal to said first and third trial vectors, of the discrepancy vector joining the heads thereof; means actuating said first named adjustable means in accordance with said parallel components; and means adjusting said first further adjustable means in accordance with the components of said discrepancy vectors normal to said first trial vectors, and adjusting said second and third further adjustable means respectively in accordance with the components of said first and second discrepancy vectors normal to said second and third trial vectors, so as to reduce all said components to zero.

8. Aircraft navigating apparatus for determining the coordinates of an aircraft on a set of Cartesian axes with respect to which the abscissas and ordinates of first, second, and third ground stations are known, when the differences between the distance from the first ground station to the aircraft and the distances from the other ground stations to the aircraft are also known, comprising, in combination: means adjustable to give an output in accordance with the length of a first trial vector extending in a random direction from the first ground station to terminate at a first assumed position of the craft; means adjustable to give outputs in accordance with the lengths of second and third trial vectors which extend in random directions from the second and third ground stations to terminate at second and third assumed positions of the craft, and which continuously differ in length from said first trial vector by the known distance differences; means adjustable to give outputs in accordance with the known coordinates of the ground stations; means adjustable to give outputs in accordance with said random directions of said trial vectors; computing means, energized in accordance with said outputs, for determining the coordinates of said assumed positions of the craft; means in said computing means for giving outputs in accordance with the components, parallel and normal to said trial vectors, of discrepancy vectors joining the first assumed position of the craft with the second and third assumed positions thereof; and means actuating said first named adjustable means in accordance with said parallel components, and simultaneously actuating said last named adjustable means in accordance with said normal components, so as to reduce all said components to zero.

9. Aircraft navigating apparatus for determining the coordinates of an aircraft on a set of Cartesian axes with respect to which the abscissas and ordinates of first, second, and third ground stations are known, when the differences between the distance from the first ground station to the aircraft and the distances from the other ground stations to the aircraft are also known, comprising, in combination: means adjustable to give a plurality of outputs in accordance with the assumed length of a first trial vector extending from the first ground station in a random direction to terminate at a first assumed position of the craft; means modifying certain of said outputs, in accordance with the known distance differences, to give further outputs in accordance with the lengths of second and third trial vectors extending in random directions from said second and third ground stations to terminate at second and third assumed positions of the craft; means adjustable to give outputs in accordance with the known coordinates of the ground stations; means adjustable to give outputs in accordance with said random directions of said trial vectors; computing means, energized in accordance with said outputs, for determining the coordinates of said assumed positions of the craft; means in said computing means for giving outputs in accordance with the components, parallel and normal to said trial vectors, of discrepancy vectors joining the first assumed position of the craft with the second and third assumed positions thereof; and means actuating said first named adjustable means in accordance with said parallel components, and simultaneously actuating said last named adjustable means in accordance with said normal components, so as to reduce all components to zero.

References Cited in the file of this patent

UNITED STATES PATENTS

| | | |
|---|---|---|
| 2,003,240 | Brockstedt | May 28, 1935 |
| 2,382,709 | Greene et al. | June 23, 1941 |
| 2,389,359 | Grow | Nov. 20, 1945 |
| 2,430,244 | O'Brien | Nov. 4, 1947 |
| 2,434,270 | Holden | Jan. 13, 1948 |
| 2,471,821 | Kutzler et al. | May 31, 1949 |
| 2,472,129 | Streeter | June 7, 1949 |
| 2,496,674 | Omberg | Feb. 7, 1950 |
| 2,530,902 | O'Brien | Nov. 21, 1950 |
| 2,539,616 | Gehman | Jan. 30, 1951 |